(12) United States Patent
Soucy

(10) Patent No.: US 6,688,018 B2
(45) Date of Patent: Feb. 10, 2004

(54) APPARATUS FOR BULK DRYING OF SLICED AND GRANULAR MATERIALS

(76) Inventor: Paul B. Soucy, 119 West St., Methuen, MA (US) 01844-1325

( * ) Notice: Subject to any disclaimer, the term of this patent is extended or adjusted under 35 U.S.C. 154(b) by 0 days.

(21) Appl. No.: 10/238,548

(22) Filed: Sep. 11, 2002

(65) Prior Publication Data

US 2003/0079363 A1 May 1, 2003

Related U.S. Application Data

(63) Continuation-in-part of application No. 10/166,340, filed on Oct. 26, 2001, which is a continuation-in-part of application No. 09/592,333, filed on Jun. 13, 2000, now Pat. No. 6,438,862, which is a continuation-in-part of application No. 09/021,360, filed on Feb. 10, 1998, now Pat. No. 6,202,321.
(60) Provisional application No. 60/043,364, filed on Apr. 2, 1997.

(51) Int. Cl.[7] ................................................. F26B 19/00
(52) U.S. Cl. .............................. 34/68; 34/210; 34/230; 426/466
(58) Field of Search ........................... 34/168, 170, 174, 34/176, 230, 210, 68, 93; 126/629, 704; 426/465, 466

(56) References Cited

U.S. PATENT DOCUMENTS

| | | | |
|---|---|---|---|
| 278,199 A | 5/1883 | Sweeney | |
| 1,556,865 A | 10/1925 | Muller | |
| 4,045,880 A | 9/1977 | Steffen | |
| 4,099,338 A | 7/1978 | Mullin et al. | |
| 4,122,828 A | 10/1978 | DiPeri | |
| 4,263,721 A | 4/1981 | Danford | |
| 4,391,046 A | 7/1983 | Pietraschke | |
| 4,490,926 A | 1/1985 | Stokes | |
| 4,501,074 A | 2/1985 | O'Hare | |
| 5,001,846 A | 3/1991 | Andrassy | |
| 5,038,498 A | 8/1991 | Woolsey | |
| 5,065,528 A | 11/1991 | Kaneko et al. | |
| 5,584,127 A | 12/1996 | Sutherland | |
| 5,732,562 A | 3/1998 | Moratalla | |
| 5,893,218 A | 4/1999 | Hunter et al. | |
| 5,915,815 A | 6/1999 | Moore et al. | |
| 5,960,560 A | 10/1999 | Stoll | |
| 5,960,561 A * | 10/1999 | Parodi et al. | ............... 34/550 |
| 6,029,467 A | 2/2000 | Moratalla | |
| 6,032,384 A * | 3/2000 | Fingerson et al. | ............ 34/427 |
| 6,223,454 B1 * | 5/2001 | Fingerson et al. | ............ 34/427 |
| 6,230,419 B1 * | 5/2001 | Hinter et al. | ................ 34/381 |

* cited by examiner

*Primary Examiner*—Ira S. Lazarus
*Assistant Examiner*—Kathryn S. O'Malley
(74) *Attorney, Agent, or Firm*—Maine & Asmus

(57) ABSTRACT

A heated airflow dryer system for drying granular, crushed, and in particular, sliced fruit and other crops and materials where granules are of at least about one quarter inch diameter or slices are about one quarter inch or more thickness. An integral or removable materials holding container has multiple removable airflow plates configured with airflow channels extending through the container interior connecting an inlet high pressure plenum to a lower pressure outlet plenum of a primary heated airflow circuit. The airflow plates are parallel and uniformly spaced to form vertical or horizontal bays of sufficient width to hold the granules or slices. The primary airflow is directed through the container. An air dryer removes excess moisture in the primary airflow or a secondary airflow circuit, which may incorporate a heat exchanger, exhausts moist air and provides make up air to the primary airflow.

32 Claims, 19 Drawing Sheets

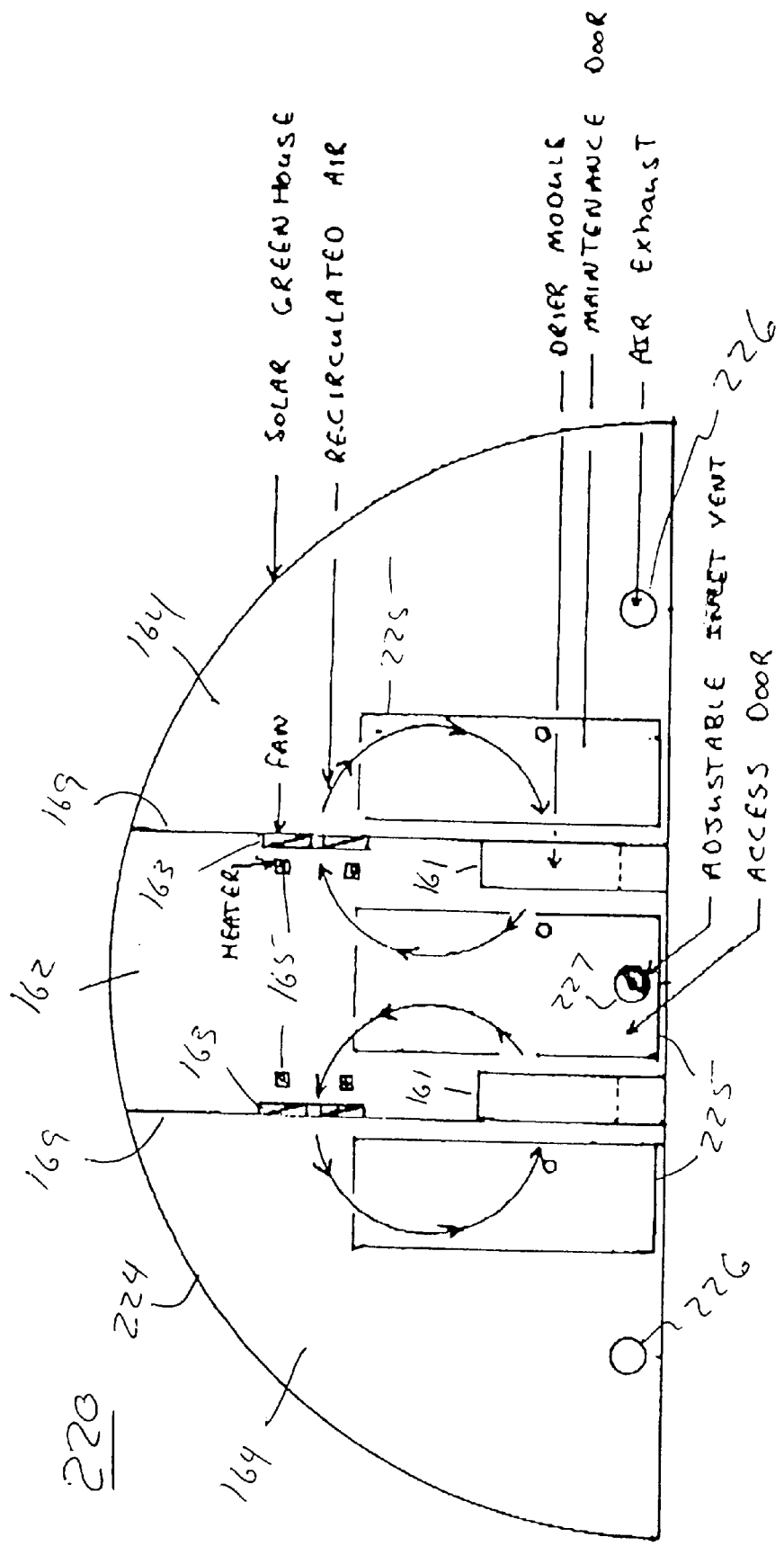

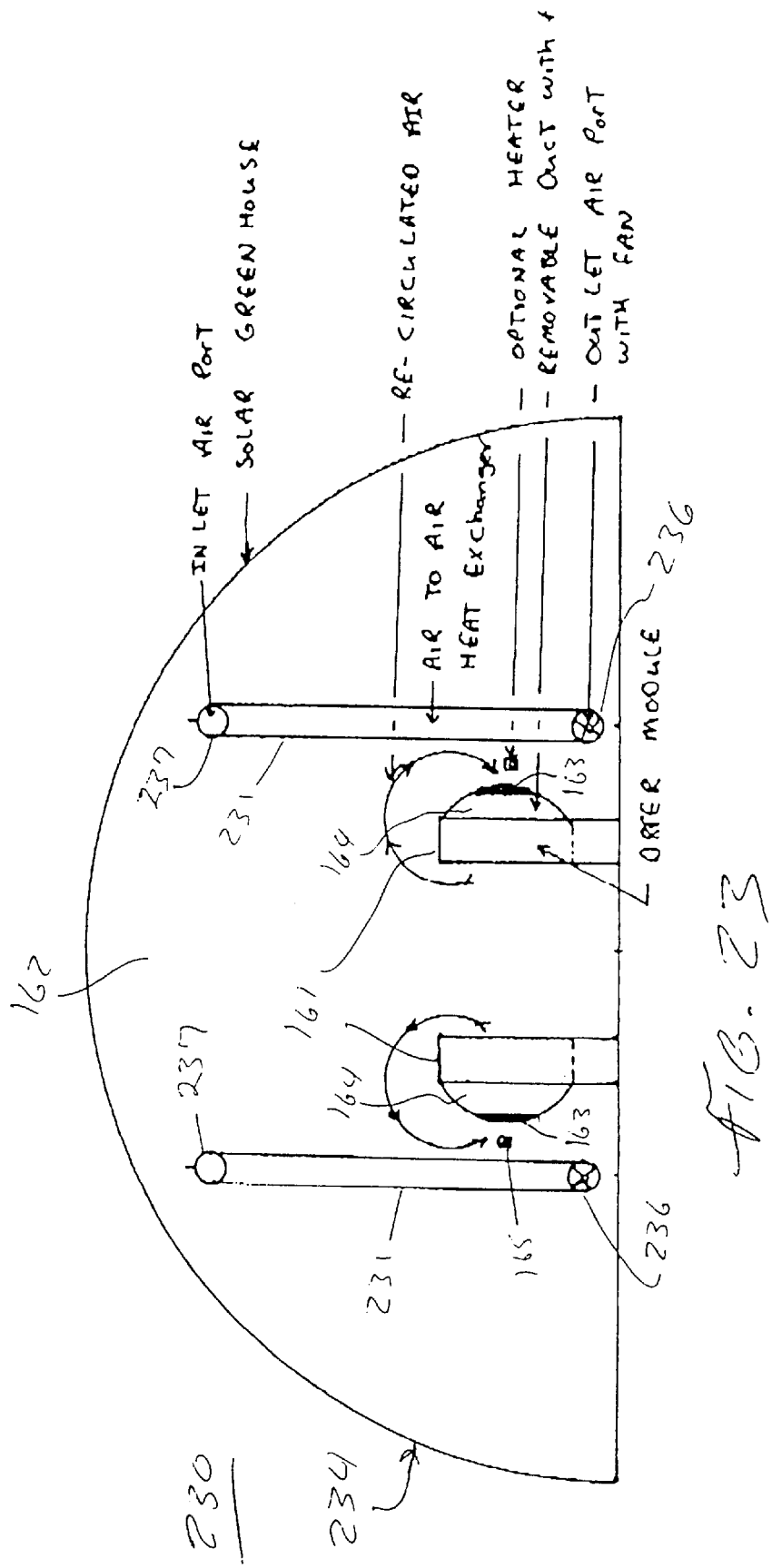

APPARATUS FOR BULK DRYING OF SLICED AND GRANULAR MATERIALS

This application is a continuation-in-part of U.S. application Ser. No. 10/166,340, filed Oct. 26, 2001, which is a continuation in part of U.S. application Ser. No. 09/592,333, filed Jun. 13, 2000, now issued U.S. Pat. No. 6,438,862, which is a continuation in part of U.S. application Ser. No. 09/021,360, filed Feb. 10, 1998, now issued U.S. Pat. No. 6,202,321, which is a non-provisional of U.S. Provisional Application Ser. No. 60/043,364, filed Apr. 2, 1997.

BACKGROUND OF THE INVENTION

1. Technical Field of the Invention

This invention most generally relates to methods and apparatus for drying sliced and granular materials and small fruit crops with a heated airflow, and more particularly to distributed airflow containers and airflow circulation systems with simple open loop airflow circuits and complex open and closed loop airflow circuits for batch drying of diced, sliced or granular materials up to berry size to reduce the moisture content.

2. Background

The drying or reduction in moisture content of berries, cherries, grapes, nuts, whole fruits, sliced fruits, meats, and bulk materials provided in the form of granules or slices or small pieces is an old and well informed field of art. For example, the art of harvesting and processing coffee beans from tree-borne "cherries" to the green coffee bean of commerce consists of two principle methods, the "dry" method and the "wet" method. Either method must result in moisture content equivalent to one third or more of the bean's weight being removed, to produce a commercial product.

The dry method is the more ancient and rudimentary. The cherries are hand-picked all in one picking, washed, and sun-dried on drying ground or concrete slabs in thin layers, usually for a period of two to three weeks. The beans are heated by solar radiation from above and by secondary radiation from the already warmed concrete slab below, while natural circulation of relatively dry air over the top of the beans slowly leaches out the moisture. The beans ferment during the process, and are turned several times a day to promote even drying. They are covered at night to protect them from reabsorbing moisture during the night time dew point and temperature changes.

In the wet method, only the ripe cherries are picked in any one picking of a tree. It may take three to five sequential pickings in a season over the time it takes between the earliest and the latest cherries to ripen. After the cherries are washed, the outside fruit pulp is removed by machines and the berries are then placed into large concrete tanks to ferment for twelve to twenty-four hours, then poured into concrete sluiceways or washing machines to be thoroughly washed in constantly running water. Then they are dried in much the same way as in the dry method, except that the drying time is shorter. These beans are then processed through hulling machines to remove the remaining layers of skin.

Problems with either method of this art include the inefficient, labor-intensive and lengthy sun-drying time of beans arranged on open air slabs. There have been introduced over the years, other manual, passive solar methods and devices attempting to promote and control air movement in combination with heat, to remove the moisture from bulk crops. Most typically, the beans or other materials being dried, are supported on a foramenous surface or in a container having at least foramenous bottom surface or screen, to permit a greater degree of circulation or air flow in contact with the underside as well as the topside of the bulk materials.

Various electrical powered and/or fuel-fired dryer systems have also been used to try to accelerate the drying time and prevent mold problems. There are many patents that describe related technologies and devices. Most of these alternatives add expense and complexity to an otherwise simple process. Failing to safeguard the beans from excess moisture, in particular the formation of mold during the drying process is crucial as the value of the crop drops dramatically if mold occurs. Over drying can also occur using accelerated methods; this also affects the quality and value of the crop. A sampling of the art of convective and low pressure air drying systems is included to provide context for the reader:

Stokes' U.S. Pat. No. 4,490,926 (1985) discloses a solar drying device and method for lumber, tobacco and grain. It includes a solar collector, a drying chamber, and a dehumidification system. The background section mentions solar heated kilns and dryers with easy access and containerized methods, wheeled vehicles or carts, for moving materials into and out of the dryer. Insulation and double glazing of light-admitting sheet materials is discussed, as is passing air between a drying chamber and a dehumidifying chamber. The focus is on drying and reusing the air.

Sutherland's U.S. Pat. No. 5,584,127 (1996) is a recent patent for a solar powered fruit dryer. The focus of the apparatus design is on recirculation of a portion of the drying gas. It refers to air circulating through perforated shelves (col. 4, line 32) upon which the materials are arranged. Column 4, line 60, describes the physical embodiment in some detail, including air flow volumes.

Andrassy's U.S. Pat. No. 5,001,846 (1991) is a solar drying apparatus with a translucent sloping top and means for evacuating the condensation from the moist air. The specification describes a perforated or porous tray on which the materials are arranged for drying. A solar powered fan forces drying air vertically through the porous tray.

Mullin's U.S. Pat. No. 4,099,338 (1978) shows an elaborate, solar-assisted dryer for tobacco, onions, titanium dioxide drying, polyester fiber setting, and roasting nuts and cereals. The focus appears to be on ratios of solar heated makeup air in the circulation system to save fuel. The material is dried on a foraminous conveyor belt.

O'Hare's U.S. Pat. No. 4,501,074 (1985) is a convection powered solar food dryer that discloses a solar collector on the inlet side for heating intake air, and a vertical solar tower or column to accelerate the convection of warm air through the system by suction. The actual drying chamber can be removed from the solar devices at each end of the convection system. The materials are arranged on shelves in the drying chamber.

Steffen's U.S. Pat. No. 4,045,880 (1977) is a solar grain drying apparatus. It discloses a fan forced down draft eave inlet solar roof heating system, that then drives the drying air up through the perforated floor of the central drying chamber. The air is then exhausted upwards roof exhaust fans in the drying chamber ceiling.

Muller's U.S. Pat. No. 1,556,865 (1923) is a solar powered dryer system for vegetable matter, consisting of a series of circumferential racks with inlet perforations in the sidewalls and internal shelf brackets in the corners for holding drying shelves or trays. The racks are configured for interlocked stacking underneath a solar collector roof which has a central exhaust vent.

Pietraschke's U.S. Pat. No. 4,391,046 (1983) is a solar heated grain drying system featuring an inlet manifold receiving multiple collector pipes and a fan blowing the intake air up through a perforated floor in the drying chamber.

Sweeny's U.S. Pat. No. 278,199 (1883) is a coffee roaster showing perforated drums for containing the coffee beans, configured to revolve within a heated chamber. The drums are feed by hoppers through the ends. The drums use internal vanes to distribute the beans or other materials lengthwise, particularly for loading and unloading the drums. Heating is by other than solar means.

Danford's U.S. Pat. No. 4,263,721 (1981) is a tobacco curing and drying structure that is configured for adding makeup air, using a heat exchanger and means for partial recirculation.

The drying of coffee beans is exemplary of the prior art. The drying or dehydrating of fruits, nuts, vegetables and other food crops and naturally granular or crushed or sliced materials is a much frequented subject in the prior art. It is noteworthy that a sliced and dried piece of fruit has a significantly higher value than the freshly harvested product. While coffee and related bulk crops were the subject of the parent applications, the principles disclosed there are extended in both content and application in the disclosure that follows.

SUMMARY OF THE INVENTION

The invention in it's simplest form is a low pressure airflow dryer or dehydrator system for reducing the moisture content in berries, cherries, grapes, nuts, whole fruits, sliced fruits and garden foods, sliced meats, and bulk materials in the form of small pieces or granules or slices, and sliced crops in particular. Materials for which the invention is suitable can be divided into three categories by size and shape. The first category encompasses granular or crushed crops and whole nuts and berries; such as rice, whole coffee beans, cocoa beans, vanilla beans, crushed coconut, blueberries, strawberries, cranberries, and other seeds, pods, grains and materials having naturally occurring small specimens, or being easily reduced to small pieces by crushing, chipping, cutting, freezing and breaking, or other mechanical means, of a nominal average diameter between one quarter and about one inch, and having sufficient structural integrity to be disposed at least several inches deep, preferably as deep as three or four feet, without damage that would affect its dried value. In the case of relatively hard granular bulk materials such as coffee beans, commercial embodiments may utilize much greater depths in combination with complex airflow circuits and automated loading and unloading mechanisms.

The second category is bulk materials including fruits, vegetables and other crops, specimens of which can be easily reduced to slices of uniform thickness between about one quarter and one inch, and still have sufficient structural integrity to be stacked edgewise at least several inches and preferably to as high as three to four feet within the apparatus of the invention for drying, without damage that would affect its dried value. Examples include fruits such as apples, pears, mango, papaya, and carrots.

The third category is bulk materials including crops, specimens of which can be easily reduced to slices of uniform thickness as described above, but which may not have sufficient structural integrity to be stacked vertically on edge, and so are preferably handled in a horizontal plane without stacking. Examples include crops such as tomatoes, peaches, watermelon and bananas.

At the core of the system, there is a specialized bulk crop container specially configured to form a system of open wall airway channels uniformly distributed throughout the container and hence the selected bulk material when it is added to the container, the airways connecting through openings in the top and bottom or through opposing sides of the container as airflow inlets and outlets connecting to a closed or semi-enclosed primary airflow circulation system so that a distributed airflow can be directed through the airway network of the container to leach excess moisture efficiently from the bulk material. The container may be integral to the dryer system or removable.

The primary airflow system has a heater to elevate the air temperature so as to be able to absorb more moisture. The heater may be a heat exchanger of any type or a heat generator such as an electric heating element. The airflow is maintained by an air mover of any type, most typically a simple fan. The flow rates and pressure drop across the container are not excessive, generally within the range of standard HVAC (heating, ventilation and air conditioning) industry practices.

A more limited secondary or exterior airflow or circulation path provides a partial exhaust and makeup air supply to the primary airflow system, so that moisture levels are kept below the saturation level. A heat exchanger using the inlet and exhaust airflows of the secondary airflow system may be employed to elevate the temperature of the inlet or makeup air so as to hold more moisture, by scavenging heat from the exhaust airflow.

The key to creating an open-wall airway network distributed throughout the container is the use of an internal structural network of minimal volume that provides an array of open face grooves or channels spanning the height and width of the container. The width of the open face each groove or channel is specified to be sufficiently narrow to prevent more than partial penetration into the groove by an average size granular type material being dried, and still pass a useful volume and rate of drying air without undue restriction or pressure drop. The parallel set of dividing partitions between the airflow channels provides an adequate surface area and sufficiently closely spaced support grid to support the sliced materials being dried. The depth of the groove or channel is sufficient to assure an airflow passageway will remain open the full length of the groove or channel, when the container is full of the bulk or sliced material.

An efficient form of the required internal structure of the container is a series of parallel partitions or airflow plates, dividing the container into a parallel set of uniformly thin bays or compartments, preferably in the order of three eights to one inch in width. The bays may be arranged in the vertical plane or the horizontal plane. In either case the opposing faces of each bay feature a parallel set of grooves running the full height or width of the partition, and terminating at or actually projecting through a foramenous end wall or bottom panel such that the airway formed by the groove is accessible to an airflow that is ducted or channeled to that wall or bottom panel. It will be apparent that the partitions themselves consume width in the container between compartments, in order to provide the unobstructed, uniformly distributed air channels that are a hall mark of the invention.

As described, each groove or channel has an open face exposed to the bulk material, while being sufficiently narrow to prevent the pieces or slices of materials from penetrating into the groove. This provides a significant surface area of the material with direct or near direct exposure to the drying effects of the airflow in the groove or channel. Closely adjacent airflow channels or grooves on each airflow plate, and closely spaced airflow plates uniformly distributed within the container volume, assure a uniform and relatively quick penetration of the drying effects of the airflow as to the material in the container.

Practical embodiments of partition material, as will be discussed more fully below, include ribbed panels, where both sides of a panel are configured with parallel sets of raised ribs, the spaces in between which are grooves; and corrugated panels, where both sides of the panel present to their respective bays or compartments, a parallel array of ridges and grooves. Raised ribs or round corrugations, rather than sectional or box corrugations with flats, have a further benefit of offering only a tangential point of contact to the materials being contained. Other forms and embodiments of the internal structure are within the scope of the invention.

The preparation of fruit or other materials needing to be sliced for loading and drying requires the fruit to be sliced into uniformly thick slices that will fit closely within the width of the drying compartments and slide into a closely packed arrangement without binding. There is no particular orientation required of the fruit for slicing, so the slicing can be easily automated or semi-automated for speedy slicing. In the case of category two vertical orientation of the bays and vertical stacking for drying, the edgewise oriented column of slices in the compartments must not be so tall as to seriously crush the slices at the bottom. However, this has not been a problem with containers suitably sized for manual handling and compartments in the order of three eighths or one half inches wide and up to 30 inches tall. Containers for category three sliced materials are arranged with partitions in the horizontal plane, so that each partition acts as a ribbed tray for the bay above it, suspending the slices sufficiently on the air channel partitions to permit drying airflow beneath the slices as well as over them.

The cycle of loading and unloading of the bulk materials into and out of the dryer system may be enhanced by configuring the container or containers with bottom panel gates or sliding gates which can be opened to dump the contents of each bay, and closed for refill and operation of the dryer, without removing the container from the system. An optional vibrator may be attached to the container or framework of the apparatus to aid in filling and emptying the container. The vertical bay container may be manually filled with sliced materials through the open top, more akin to how granular bulk crops such as coffee beans are loaded, with greater speed and efficiency by carefully metering the sliced materials out of a dispensing container so as to flow the slices into the open end of the container with an orientation parallel to the partitions.

An alternative method for loading of materials, and in particular category three materials, is to arrange the container so that the airflow plates are in the horizontal plane. The grooved plates or panels can then be removed sequentially or collectively through an open end of the container for manual or automated placement of a single layer of slices on each panel and reinsertion into the receiving slots of the container. A loading rack may be used to receive and deliver the full set of plates to and from the container. The loading and unloading may be further automated for higher volume commercial practices.

During the drying process, there may be some tendency for some types of fruit or other materials to stick lightly to the panels. When the drying cycle is complete, a light sweep over the panel surface releases any stuck slices. If desired, an antistick coating may be applied to the plates prior to use, or the plates may be fabricated with a non-stick surface.

As is apparent from the above description, by arrangement of the airflow panels or partitions, or by reorientation of the container, the airflow through the container with vertical bays can be arranged to be vertical or horizontal; whereas in a container configured with horizontal bays, the airflow is constrained to horizontal although it may be in either of the two orthogonal horizontal axis. Upwardly vertical airflow is particularly useful for very low airflow pressure systems such as passive solar systems where thermally generated convective airflow with minimal head pressure can be applied to a single level container. Not withstanding, short horizontal airflows may also used.

Alternatively, a user may, by using a forced airflow system, provide a much greater pressure and volume of air through the container than typical passive solar systems. This makes the larger container systems with horizontal airflow plates useful, whether configured with vertical or horizontal drying bays. Forced air circulation with or without a supplemental heat source for adding more heat to the air, speeds up the process. Using a heat pump as the air mover and dryer adds significant efficiency to the process with its ability to cycle air temperature so as to squeeze out the moisture and then reheat and recirculate the air. The user may obtain either faster drying time of a small batch of materials by pushing more air through the dryer, up to a maximum useful rate of extraction of moisture; or greater batch capacity by using larger and more complex containers with either vertical or horizontal airflow networks, interconnected with ductwork to link the containers.

The container is scalable and adaptable to smaller and larger dryer systems utilizing heat exchangers, solar radiation or other power sources for generating a warm, relatively dry, low to moderate pressure airflow. The container, inserted or connected to the airflow plenum of the system for both inlet and exhaust, absorbs the full flow of drying air through its interior. The internal construction provides a baffle effect on the pressure side of the container, which promotes very uniform distribution of airflow through the materials and even drying, overcoming a significant disadvantage of other systems.

In the passive solar drying of bulk crops such as coffee and grains, nuts and berries, and sliced fruits and vegetables, airflow is generally more limited than heat, due to the relatively low differential pressure that can be generated in low cost, practical, solar radiation dryers. It takes many hours or days to affect a significant reduction in moisture levels in the passive solar drying of crops. The relative amount of airflow to which the crops are directly exposed has been demonstrated in passive solar dryers to be the more significant factor to the dryer's utility and efficiency, than simply adding heat. Too much heat with too little air will do more damage than good. It is therefore important to configure solar powered dryers to obtain maximum flow from a relatively dry air source, and maximum exposure of the materials to the dry air flow, while retaining a low cost structure and a simple bulk container handling system.

The principle functional components of a primary dryer system of the invention are a warm, dry airflow generator, a bulk materials container configured to provide the uniformly distributed open channel airways network of the invention, structure for supporting the container within the primary dryer system in such a way as to constrain air flow to flowing through the airways of the container, and features of the container by which it can be filled and emptied.

As introduced above, a further aspect of the invention provides a complex airflow system with a closed primary loop and an open secondary loop. As distinguished from the simpler case above, there is a closing of the circulation loop or path of the primary airflow system through the container as a recirculating airflow with a good airflow rate and pressure drop through the airflow plates of the drying container and hence through a larger, lower airflow rate, mixing plenum, the pressure and airflow rate being maintained by airmover mechanisms. The airflow is heated by any suitable means and the overall enclosure may be insulated to conserve heat. Added to that is a secondary, open airflow circulation loop of more limited airflow rate that provides for partial exhaust and makeup air to the primary closed loop airflow path for removing excess moisture. This permits configuring the total system to optimize each functional element of the process at the lowest total energy cost, as will be further described below.

Still other objects and advantages of the present invention will become readily apparent to those skilled in this art from the following detailed description, wherein I have shown and described only a preferred embodiment of the invention, simply by way of illustration of the best mode contemplated by me on carrying out my invention.

BRIEF DESCRIPTION OF THE DRAWINGS

FIG. 22 is a diagrammatic cross section view of a three chamber dryer with two banks of materials containers sharing a common low pressure chamber.

FIG. 23 is a diagrammatic cross section view of a multiple container embodiment similar to that of FIG. 21, except that it includes air to air heat exchangers and fans in the secondary airflow circuit.

DESCRIPTION OF THE PREFERRED EMBODIMENT

Figure 1:
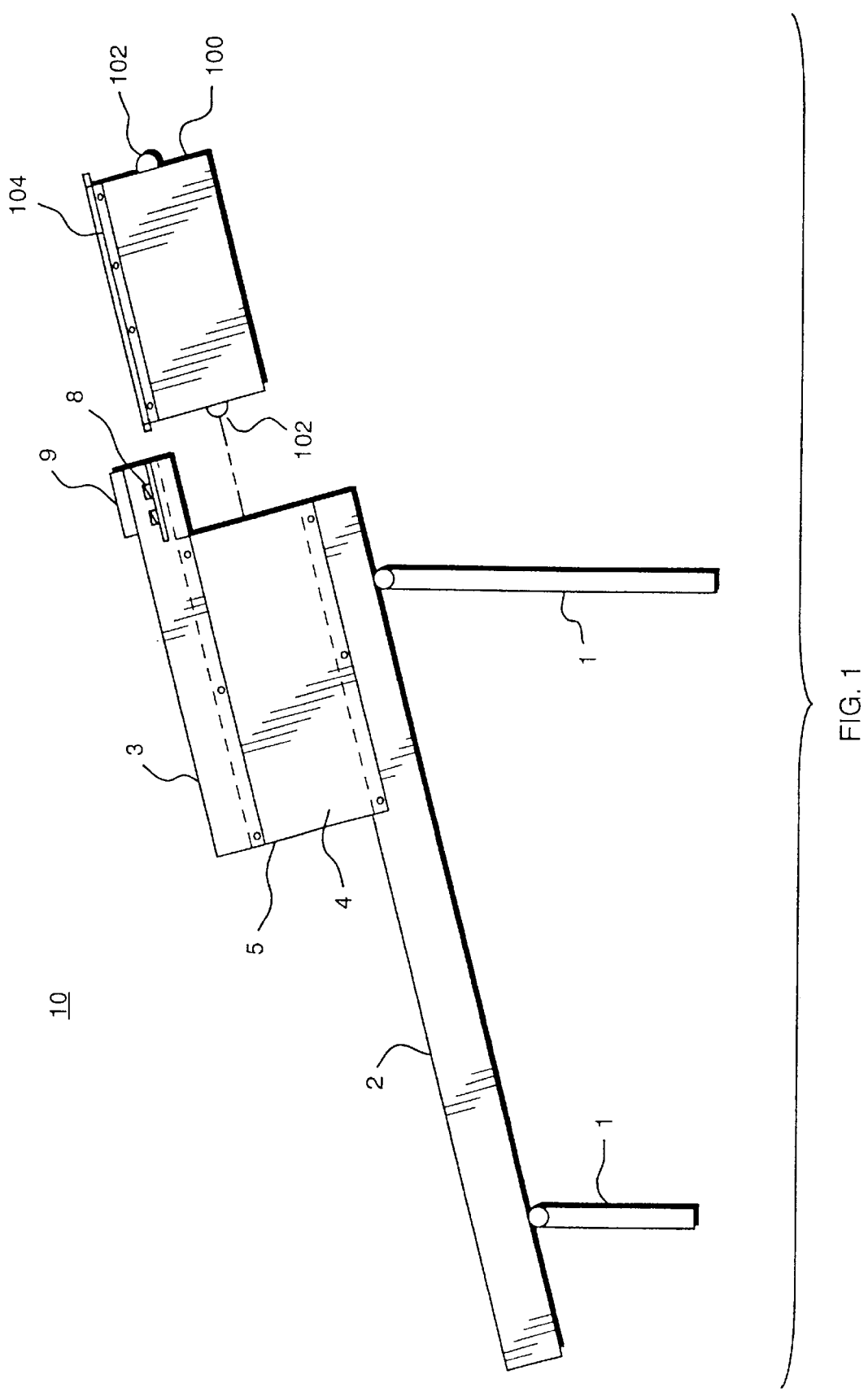
FIG. 1 is a side view of a preferred embodiment solar dryer of the invention, showing the rack, solar powered convective generator, container housing, container and transparent top assembly.
Figure 2:
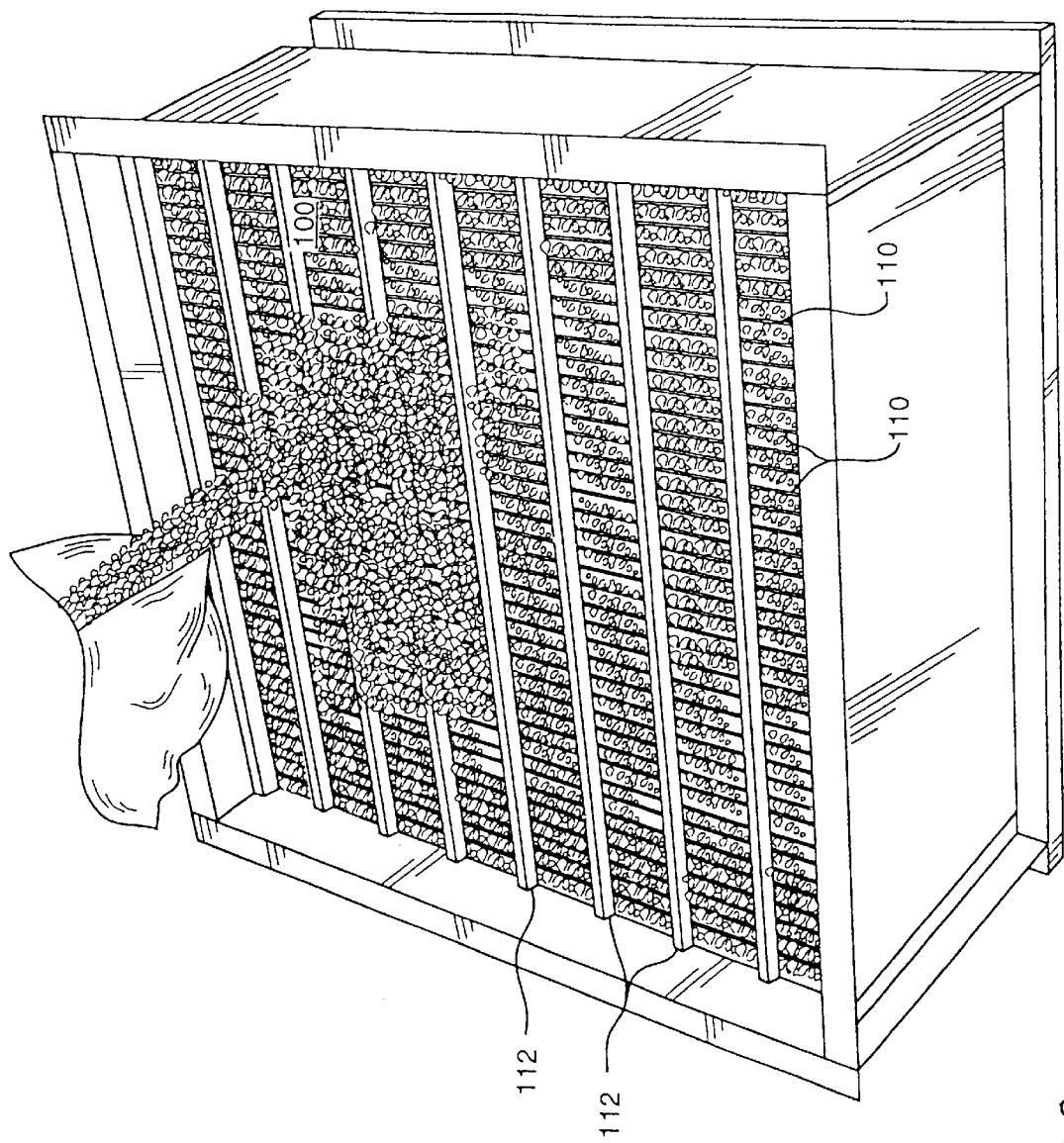
FIG. 2 is a perspective view of the container of FIG. 1, showing the filling of the compartments of the container with a bulk crop.

Referring to FIG. 1, there is illustrated an open loop solar powered dryer system 10 with a removable, vertical airflow, bulk materials container 100. Rack assembly 1 is made of pipe material secured to the ground or a base of some sort, and passive solar convective airflow generator 2 is attached to it. Top assembly solar collector 3, consisting of a frame with a translucent top surface, is attached to sidewalls 4, forming plenum 5. The top assembly is equipped with a circulation fan 8 powered by solar cell 9, which boosts the convective airflow through the dryer system. Container 100 is manually insertable through an opening in the upper end of plenum 5, by the use of handles 102.

Container 100 is configured with an interior airway network structure of uniformly distributed, vertical, open wall, airflow passageways which open through the bottom panel to admit the convective airflow generated by airflow generator 2. The channels defining the open wall airways are too deep to be obstructed by pieces or slices of materials being held in parallel alignment with the partition walls and too small to be filled by the grains or kernels of the bulk crops placed in the container for drying. The container can be filled to the top of the airway structure, the fruit slices or bulk material enjoying a distributed flow of air from bottom to top, as will be further explained in the later figures.

The interior sidewalls of plenum 5 are configured with sidebars and side skirts upon which container 100 is supported. This contact serves to divide the plenum into upper and lower chambers, and to constrain the vertical airflow to flowing from the lower chamber through the internal airways in the container into the upper chamber.

Referring now to FIGS. 3–8, container 100 has an interior network of vertical airflow plates 116, uniformly spaced and parallel to each other, extending across the width of the container. The airflow plates are held in position by slotted top support brackets 112, oriented at right angles to the airflow plates, and slotted bottom panels 114.

Figure 3:
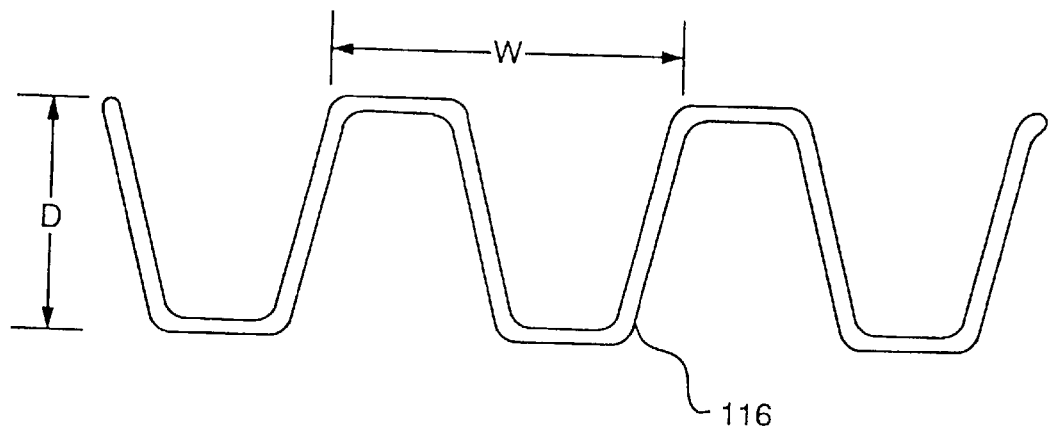
FIG. 3 is a partial edge view of a corrugated airflow plate.

The fruit or bulk material is added as shown in FIG. 3, to container 100, to a nominally full state, about level with the tops of airflow plates 110. There is a ventilated bottom panel, not shown, permitting airflow through the bottom panel and to the airflow plates.

Figure 4:
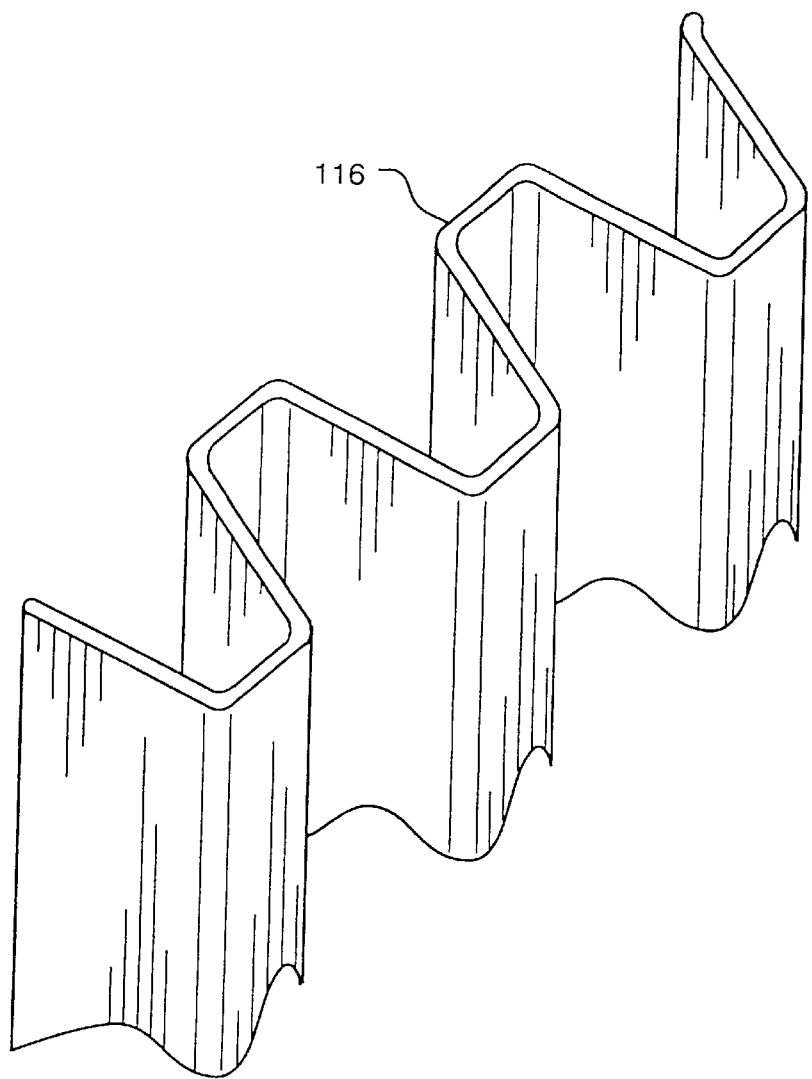
FIG. 4 is a partial perspective view of the corrugated airflow plate of FIG. 3.

Airflow plates 110 are variously fabricated as shown in FIGS. 3 and 4, of stainless steel sheets of 0.010 to 0.015 inches thick, into corrugated airflow plates 116. Aluminum is also useful material for airflow plates. Other materials can be used, including other metals or plastic. A surface coating such as Teflon can be added to metal airflow plates to reduce sticking of fruit slices.

The width and depth of the channels provided by the corrugations is determined by the size of the grains or kernels of the bulk crop being dried, when the bulk crop is granular in nature. When the container is intended for the drying of coffee beans, the depth D of the corrugations is about one eighth (⅛) inch. The width W of the corrugations is about one sixth (⅙) inch. In embodiments using these airflow channel dimensions, granular bulk crops of average grain diameter of greater than one quarter (¼) inch can also be processed. This corrugation size also works well with sliced fruit, although a somewhat larger scale to the corrugations will work, also, up to one quarter (¼) inch in width and depth. Larger scale airflow channels consume more space in the container than is necessary for effective drying when several airflow plates are used, and reduce the useful volume for the materials being processed. The dimension of the airflow plate in the direction of the airflow channels is about 8 inches. This provides a sufficiently short airflow path for assuring low static pressure across the container from inlet to outlet. Longer dimensions may be preferred for some applications or where greater airflow pressures are available.

It should be reiterated that the airflow plates need not and preferably are not perforated. Uniform distribution of airflow through the materials is initiated at the inlet baffling structure of the airplate end supports, whether bottom or sidewall of the container, between the protruding airflow plate ends and airflow plate support dividers. The airflow plate structure and contents of the container resist airflow so as to provide a small static pressure head in the inlet plenum that exerts uniform pressure across the face of the inlet structure. The airflow is then segregated by the airflow plates so as to maintain the uniform cross section distribution of airflow through the container such that the materials are uniformly dried.

Figure 5:
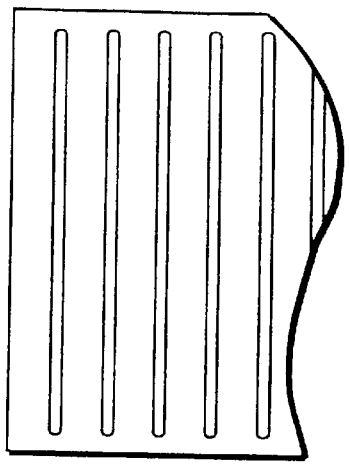
FIG. 5 is a partial plan view of a slotted bottom panel as used in the container of FIG. 2.
Figure 6:
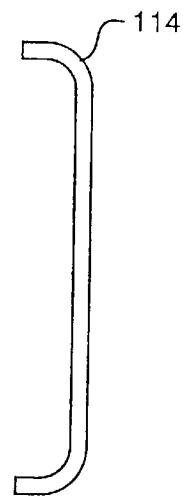
FIG. 6 is an edge view of the panel of FIG. 5, after the edges are folded to right angles.
Figure 7:
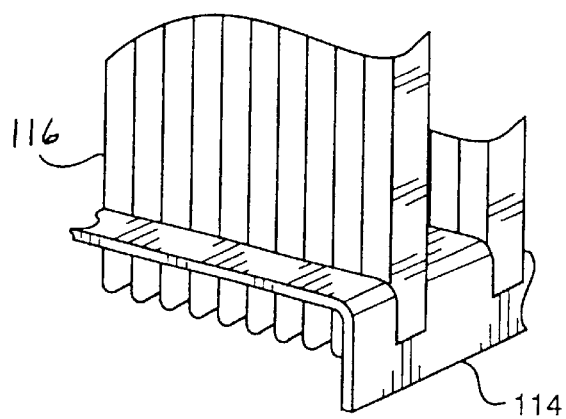
FIG. 7 is a partial perspective view of the panel of FIG. 6, with airflow plates installed in the slots of the panel.
Figure 8:
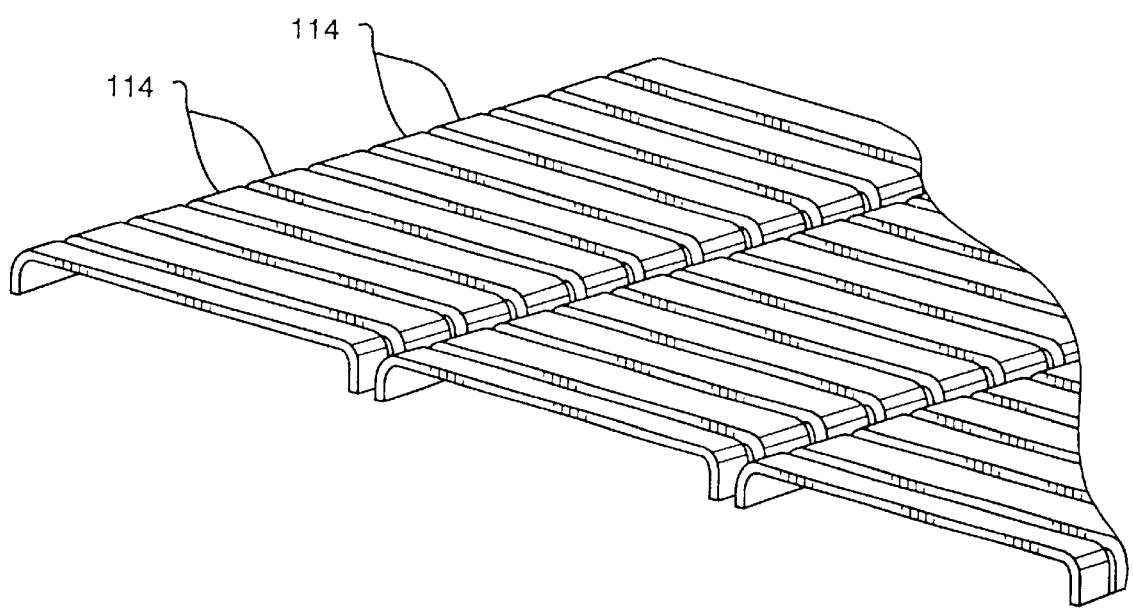
FIG. 8 is a partial perspective view of three of the FIG. 6 panels, configured as a bottom panel for the container of FIG. 2.

Referring to FIGS. 5–8, stainless steel sheet is slotted as in FIG. 5, and folded at the edges to fabricate edge panels 114 as in FIG. 6, which may be used at the bottom or side depending on container configuration, so as to hold the ends of corrugated airflow plates in a uniformly spaced, parallel relationship as in FIG. 7. The panels are arrayed as shown in FIG. 8 to form a bottom for a vertical airflow container. The bottom edges of corrugated airflow plates 116 are inserted into the slots from above, held at equidistant spacing in the container by the slots, and rest on the folded slot ends, as in FIG. 7. The channels of the slightly protruding airflow plates are thus open to airflow from beneath the container when the container is filled with bulk granular or sliced materials. A container configured for horizontal airflow would use the same panels 114 incorporated as side panels as in the container of FIG. 13.

Figure 9:
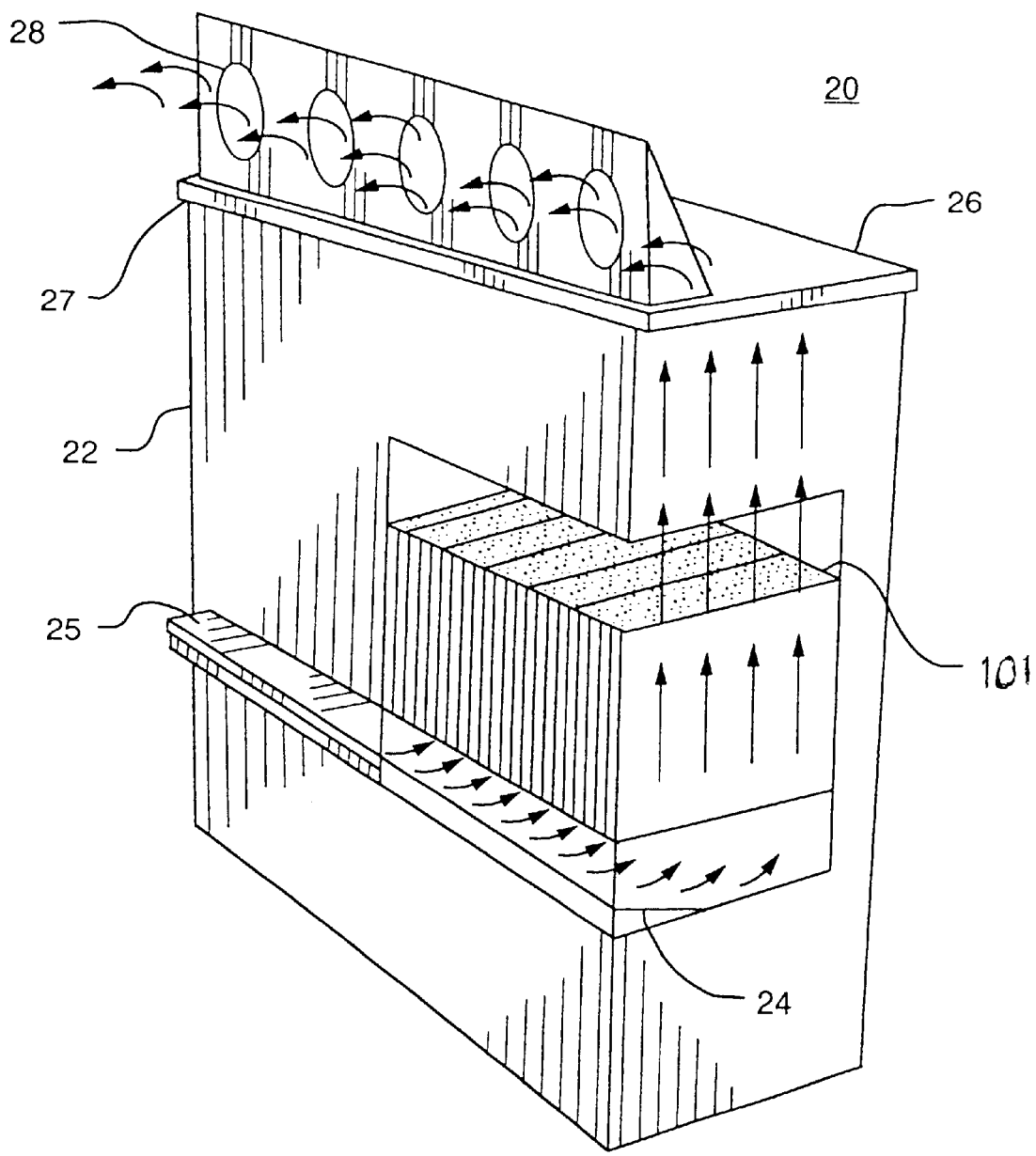
FIG. 9 is a left rear perspective view of a preferred embodiment dryer, with a partial cut away revealing the bulk material container and general airflow pattern.
Figure 10:
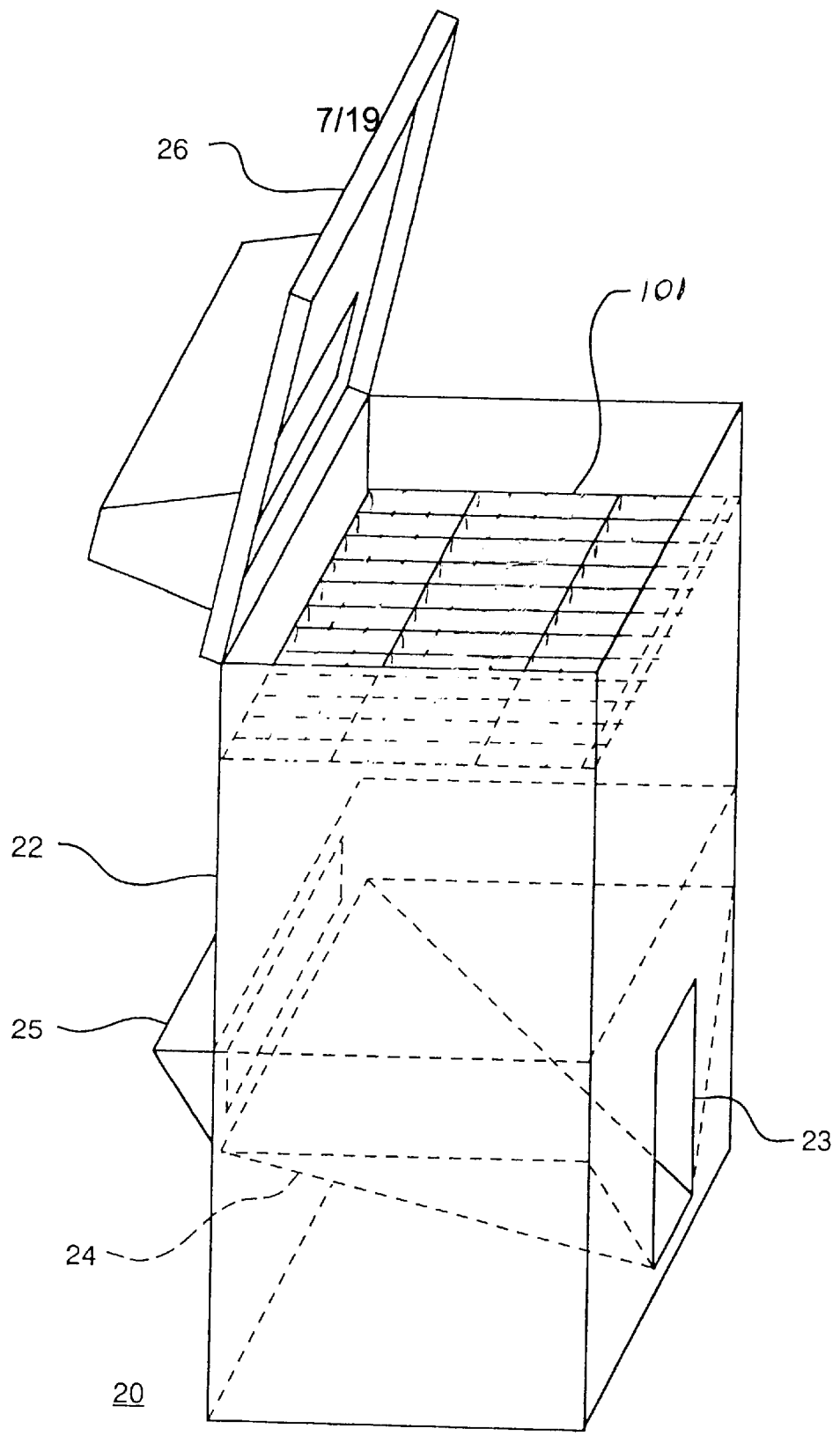
FIG. 10 is a left front perspective view of the embodiment of FIG. 1, the front and left side of the enclosure and the enclosed portion of the container shown in phantom.

Referring to FIGS. 9 and 10, an airflow dehydrator 20, consists of enclosure 22, configured with front side discharge door 23, a sloping discharge plate 24, and an airflow inlet 25 on the back side, which is a large, air manifold that can be connected to a solar, oil, gas or wood fired furnace, a solar hot air panel, or other source of warm air. Hinged top 26 is configured with exhaust ports 28, to which powered exhaust fans may be readily adapted if desired. Vertical airflow container 101 is supported within enclosure 22 so as to seal off air flow from inlet 24 to exhaust port 28, except as may pass through the airflow passageways of container 101, as further described below. Hinged top 26 may be opened for access to and filling of container 101. Bulk material, when dry and allowed to fall through the bottom of container 101, is directed by sloping discharge plate 25 towards discharge door 23 for collection.

Containers for dryers such as dehydrator 20, such as container 101, are similar, in that in both cases the bottom panels are ventilated in some fashion to connect the vertical airflow plates to the airflow source or supply. However, container 101 is distinguished from container 100 by having an openable bottom panel system, so that bulk materials can be loaded through the top and emptied when dry, through the bottom. With this arrangement, the container can be left more or less stationary in the dryer. Alternatively, the elements or functional components of container 101 can simply be integrated directly into the dehydrator 20 design, if desired.

Figure 11:
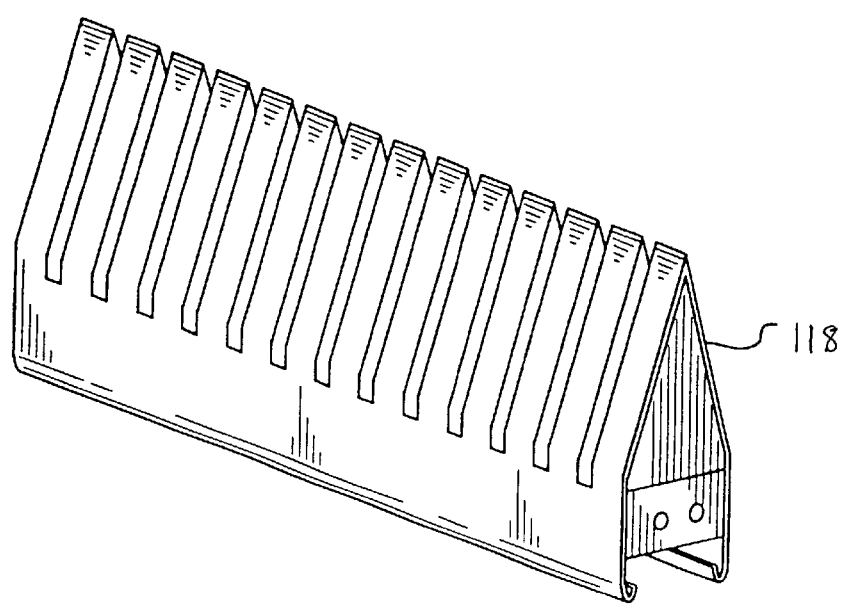
FIG. 11 is a perspective view of a slotted V brace for supporting airflow plates in a container.
Figure 12:
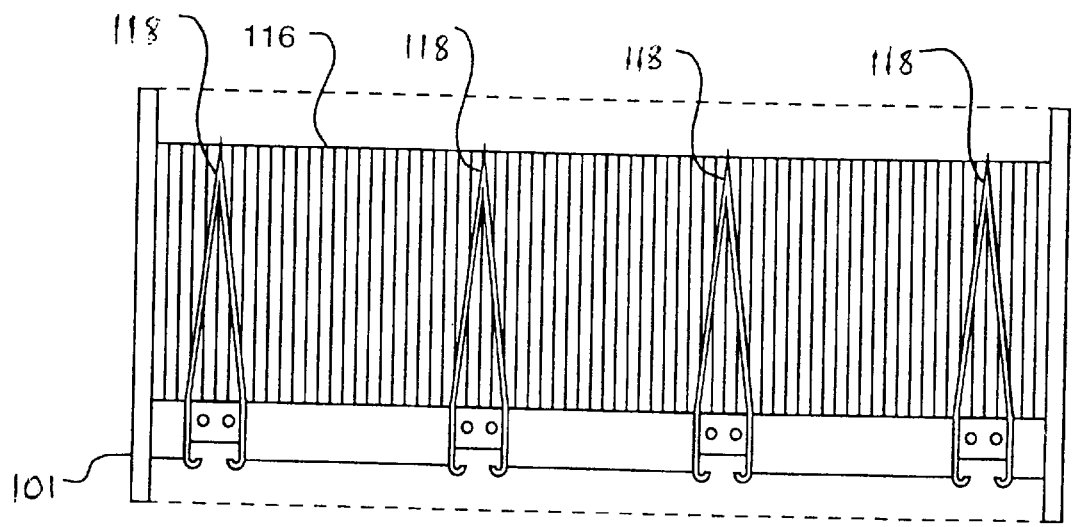
FIG. 12 is a cross section view of a vertical airflow plate container employing the slotted V brace of FIG. 11 in support of the airflow plates.

For vertical airflow containers using parallel airflow plates, it is desirable to reduce or eliminate top side support brackets so that the bulk materials can be loaded more easily to the top of the airflow plates. Referring to FIGS. 11 and 12, slotted and inverted V braces 118, uniformly spaced and attached to opposing sides of container 101, provides an open top spacing and lateral support system for a full compliment of corrugated airflow plates 116. The airflow plates are seated in the bottom of the inverted V slot. The V brace height coincides with the top of the airflow plates, permitting easy loading and leveling of the bulk materials in the container. On the bottom side of the container, the dump gates are oriented to close and open the space between the V braces. The open space within the inverted V brace 118 is lost as to container volume, but does assure even greater penetration of the sliced or granular bulk materials by the drying effect of the airflow entering from underneath, and exiting out the top of the container. V braces 118 are preferably fabricated of stainless steel.

Dryers 10 and 20 above are illustrative of small batch dryers, using relatively small containers, and employing an open loop airflow circuit where a dry airflow from a source is directed by an airmover of any sort through the container of the invention to scavenge moisture from the contents, and then exhausted to atmosphere. They can be scaled upwards within practical limits of materials. Very low pressure convective airflow pressure, such as generated by solar devices, will effectively penetrate up to a foot or more of material depth in a vertical airflow container. The benefits of these devices include low cost, simplicity, easy operation and adaptability. Greater capacity can be had by simply duplicating the apparatus as many times as desired. These devices can be configured to employ containers configured for horizontal airflow, or even downward directed vertical airflow, but would preferably include a powered fan or airmover device.

Figure 13:
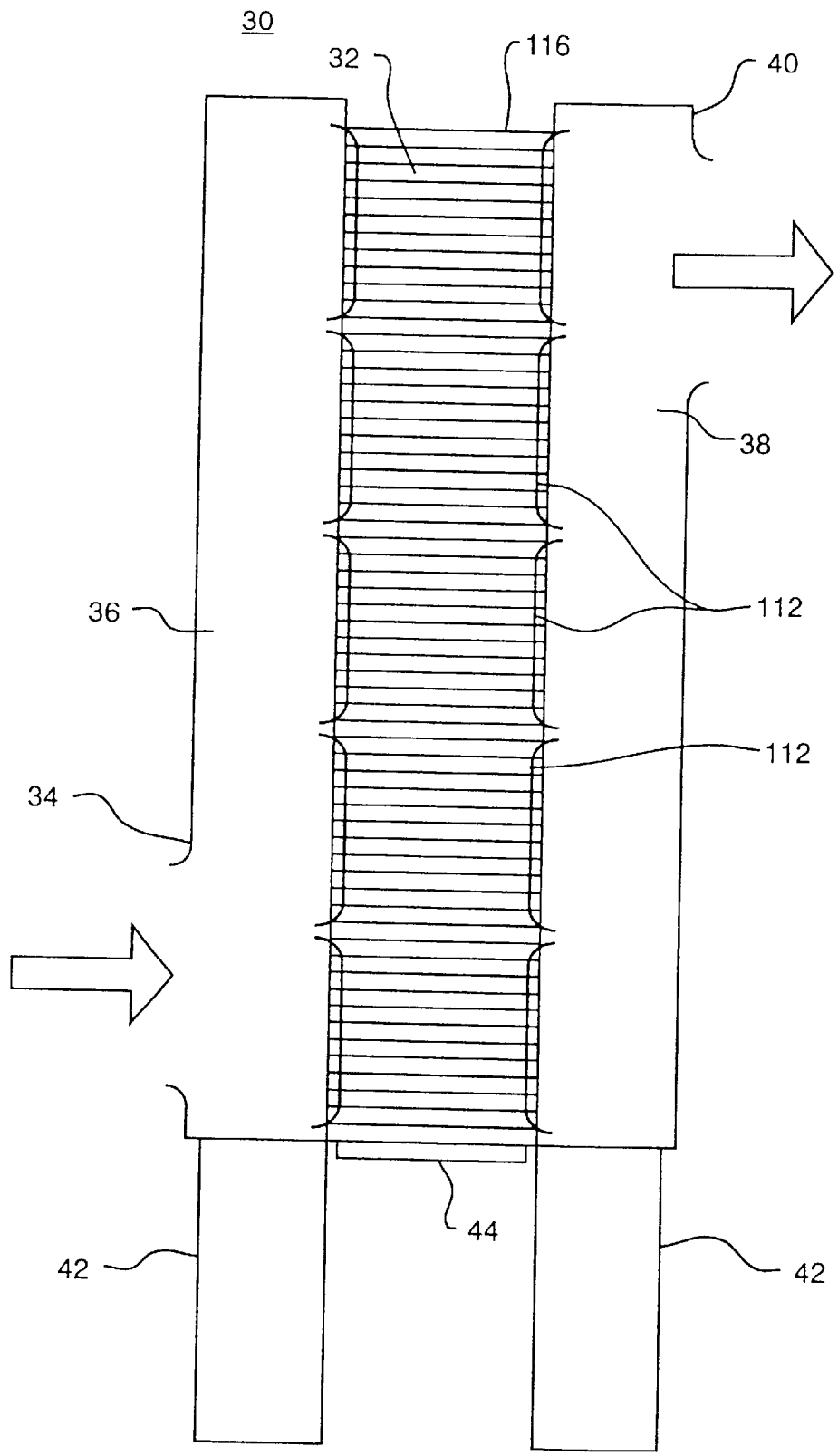
FIG. 13 is a cross section view of a horizontal airflow, corrugated airflow plate, commercial dryer system employing the slotted panels of FIGS. 5–8 for retaining the airflow plates.
Figure 15:
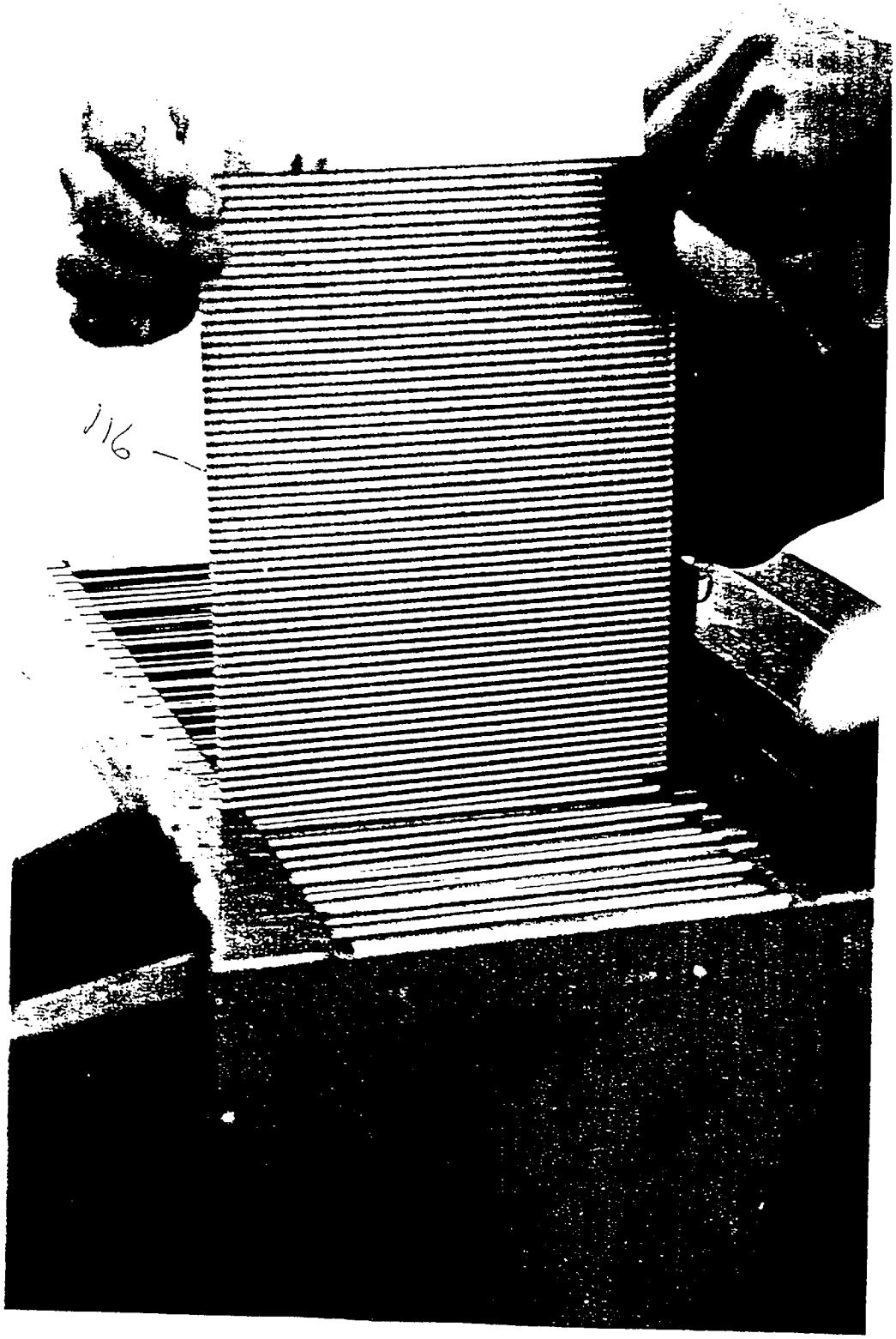
FIG. 15 is a perspective partial view of an airflow plate partially removed from the dryer of FIG. 13.

Referring to FIG. 13, there is illustrated a cross section view of a preferred embodiment, open airflow circuit, horizontal airflow commercial dryer system 30, especially suitable for drying sliced materials such as fruits and vegetables. System 30 incorporates a container 32, employing the slotted panel 114 of FIGS. 5–8, for retaining corrugated airflow plates 116 in a horizontal airflow configuration at a materials depth of up to about four feet, and a width for airflow penetration of materials of about eight inches. Container length, or module length, can be up to two feet without special consideration. Inlet 34 feeds plenum 36 and the inflow side of container 32. The horizontal airflow exits the outflow side of container 32 into plenum 38 and is exhausted out of outlet 40. Legs 42 support system 30 sufficiently high to permit opening of dump gate 44 and discharge of the bulk materials into the user's collection system. Referring to FIG. 15, airflow plates 116 can be manually removed for inspection, cleaning or other service access, and reinstalled. The airflow supply for system 30 is presumed to be fan powered on the inlet and/or outlet side, and auxiliary heat may be added to the airflow on the inlet side of the container.

Figure 14:
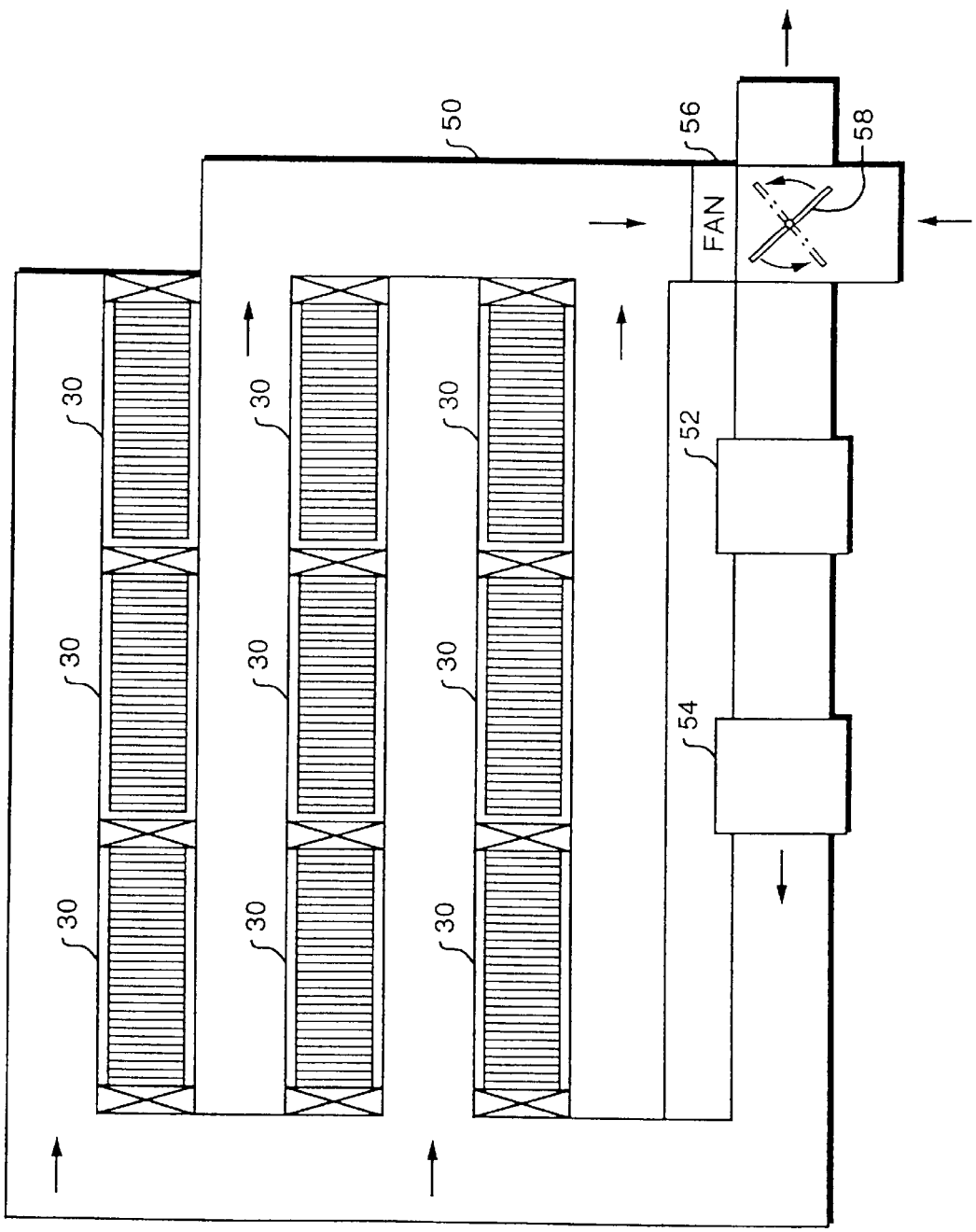
FIG. 14 is a plan view of a commercial dryer system employing the dryer of FIG. 13.

System 30 may be configured and operated as a single container unit, or ganged with ductwork as in the FIG. 14 plan view for larger operations. The FIG. 14 system includes three bays of three end to end modules 30, with ductwork 50 connecting the inlets and outlets. Dehumidifier 52 and/or hot air furnace 54 are connected in the upstream side of the airflow. Exhaust fan 56 is connected on the downstream side of the airflow. System 30 is here illustrated as an open airflow circuit system, but note that airflow control valve 58 enables the primary airflow circuit to be closed for recirculation of the air for heat conservation, where exhaust fan 56 functions as a recirculation fan, and where dehumidifier 52 is used to remove excess moisture. Dehumidifier 52 and furnace 54 can be replaced with a heat pump, obtaining the greater efficiency of using a significant range of thermal cycling of the air for moisture removal and recirculation. Also note that in the system of FIG. 14, and in all cases where airflow is predominately controlled by fans and contained by ductwork, the distributed airway system may be configured to permit the airflow direction to be reversed. This is readily apparent in horizontal flow dryers, but is also applicable to vertical airflow dryers of the invention, without a significant increase in back pressure, due to the presence of the airways. This airflow switching technique enhances the drying process by offering quick penetration of the drying effect of the airflow on the materials from the top down as well as from the bottom up, or left and right in the case of horizontal airflow, thereby more quickly drying the entire volume of material. In an open airflow circuit system, reversed airflow will require a heater on each end of the container if heated airflow is required in both directions.

The embodiment of FIG. 13 extends to containers or material holding sections of very tall commercial drying systems for small, relatively hard granular bulk materials such as coffee beans. Systems with materials container sections having vertical depths of up to 16 feet and greater, fillable from the top and configured with hinged or slide gate bottoms for self emptying, adapted with automated filling and collection mechanisms, enable efficient drying of commercial size batches of beans or other materials. The systems may incorporate vibrators to promote easy filling and drainage of the container section. The 16 foot long corrugated airflow plates of this preferred embodiment remain limited to eight inches in width, consistent with the above description of airflow channel orientation and length. This dimension assures a minimal static pressure drop across the container from inlet to outlet with respect to the drying airflow. Such containers are likely to be incorporated into the more complex airflow systems described in FIGS. 14 and 16–23, than in simpler open loop airflow systems.

Referring back to FIGS. 1, 13 and 14, while the heat generated in a simple solar collector is adequate for a basic open airflow circuit dryer of the invention, the minimal head pressure of a relatively short solar powered airflow generator combined with the resistance of the distributed array of airflow channels through the container may result in a less than optimal volume of drying airflow through the container. Any boost to the airflow inlet pressure or flow rate through the container is found to improve the performance of the dryer. A passive, solar-generated air flow can be boosted by the addition of circulation fans at various places on the dryer, including in the convective generator section, in the upstream or source air plenum, or in the exhaust plenum. Of course, fans are often used exclusive of any passive solar contribution, in many commercial dryer installations.

Auxiliary heat, supplied by heaters, heat exchangers, or the injection of supplemental hot air, can also be added anywhere to the air flow path upstream of the container. Sensors may be added to the container or dryer to monitor pressure, airflow, humidity, time, and/or temperature; indicators may be provided locally or remotely. A local or remote, automated or programmable control means may be added for better control and/or recording of the process. Pressure sensors can be utilized to monitor the weight of the container or dryer to calculate the progress and amount of moisture reduction.

While these elements are not core components of the instant invention, use of the invention enhances the benefit provided by greater pressure and more heat, up to the point of maximum drying effect in a given configuration for a given bulk product. The division and distribution of the airflow through the bulk materials assures uniformity and rapidity of drying, thereby improving the quality of the end product and the efficiency of the system.

The method of the invention includes low temperature drying as may be done with the use of heat pumps and cooling coils. System components may be augmented for addition cooling capacity for removing moisture from the low temperature primary airflow circuit. The invention is further adaptable to freeze drying methodologies.

Now referring to FIGS. 16–23, there are shown several preferred embodiments incorporating a complex airflow circuit feature, where the primary airflow circuit is a closed loop airflow path within the system, analogous to the recirculation operation of the system of FIG. 14. There is common to all embodiments of FIGS. 16–23 at least one drying container, and a low pressure plenum connected to the outlet side of the container and divided by an airmover or fan from a high pressure plenum on the inlet side of the container. The airflow through the container is maintained by the fan, and the air temperature is maintained by a heater of some sort, so as to pass a continuous flow of warm air through the container.

Figure 16:
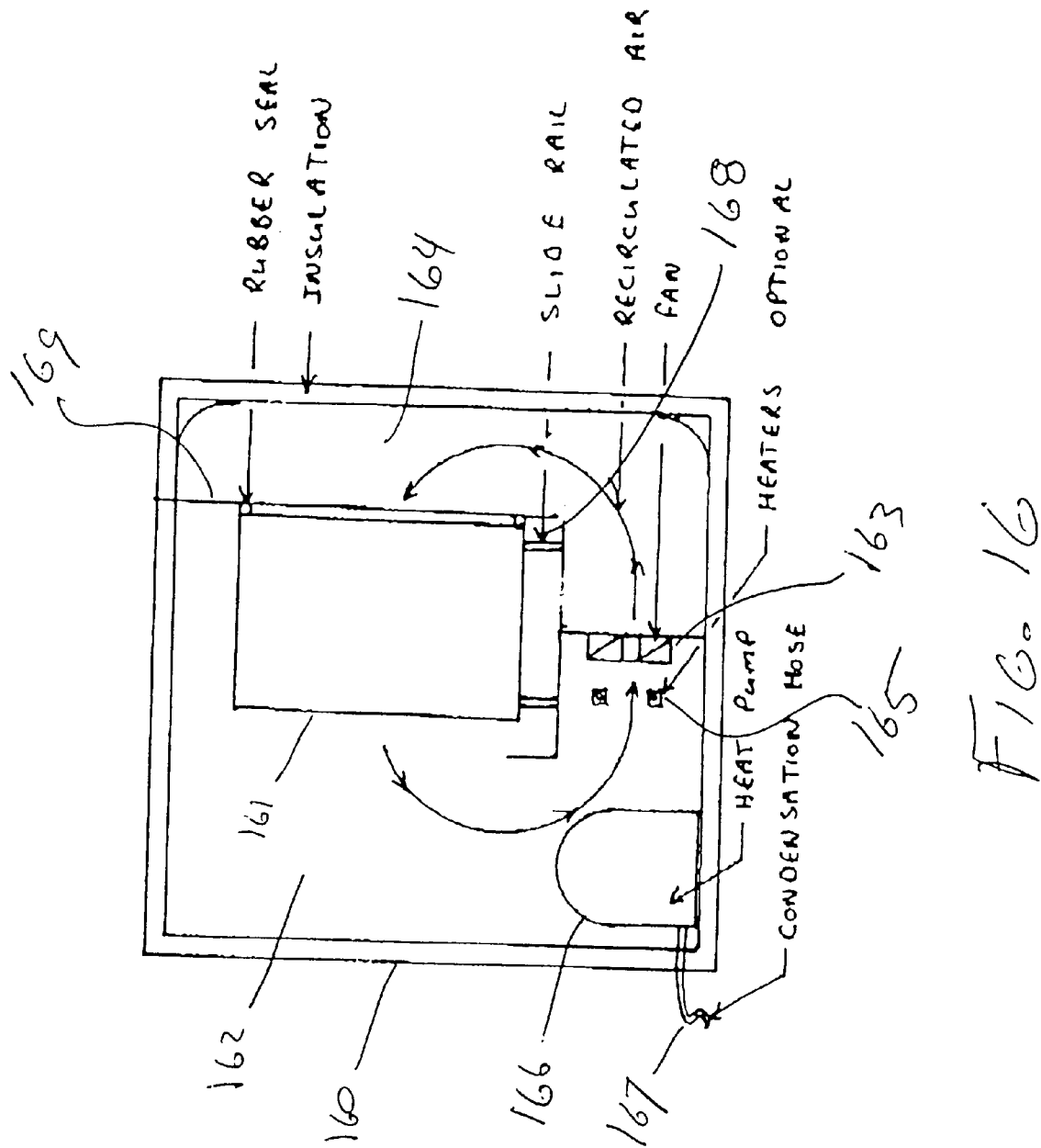
FIG. 16 is a diagrammatic cross section view of a two chamber dryer system of the invention separated by a materials drying container, with an air dryer in the low pressure chamber and a primary airflow fan between the chambers.

In FIG. 16, an insulated enclosure 160 houses a removable container 161 of the invention, the outlet of which connected to low pressure plenum 162 which is divided by fan 163 in wall 169 from high pressure plenum 164 which is connected to the inlet side of container 161. This path defines the primary airflow circuit through container 161. Electric heater 165 is positioned on the intake side of fan 163 to heat the primary airflow. Dehumidifier 166 within enclosure 160 removes moisture from the airflow, and emits it at condensate outlet 167. Container 161 rides on rails 168 for removal from enclosure 160 for filling and emptying of materials being dried, and seats when fully inserted against partition 169 to seal its inlet to high pressure plenum 164. The benefit here is that the airflow and temperature can be balanced with the best moisture removal rate from the materials, and the dehumidifier sized and operated to remove excess moisture from the primary airflow and keep the moisture level in the low pressure plenum at a suitable level.

There may be substituted for dehumidifier 166 in this embodiment or other embodiments similar in this regard, any type of air dryer or means for removing moisture from the closed primary airflow, as for example a desiccant dryer of sufficient capacity such as a desiccant wheel dryer.

Figure 17:
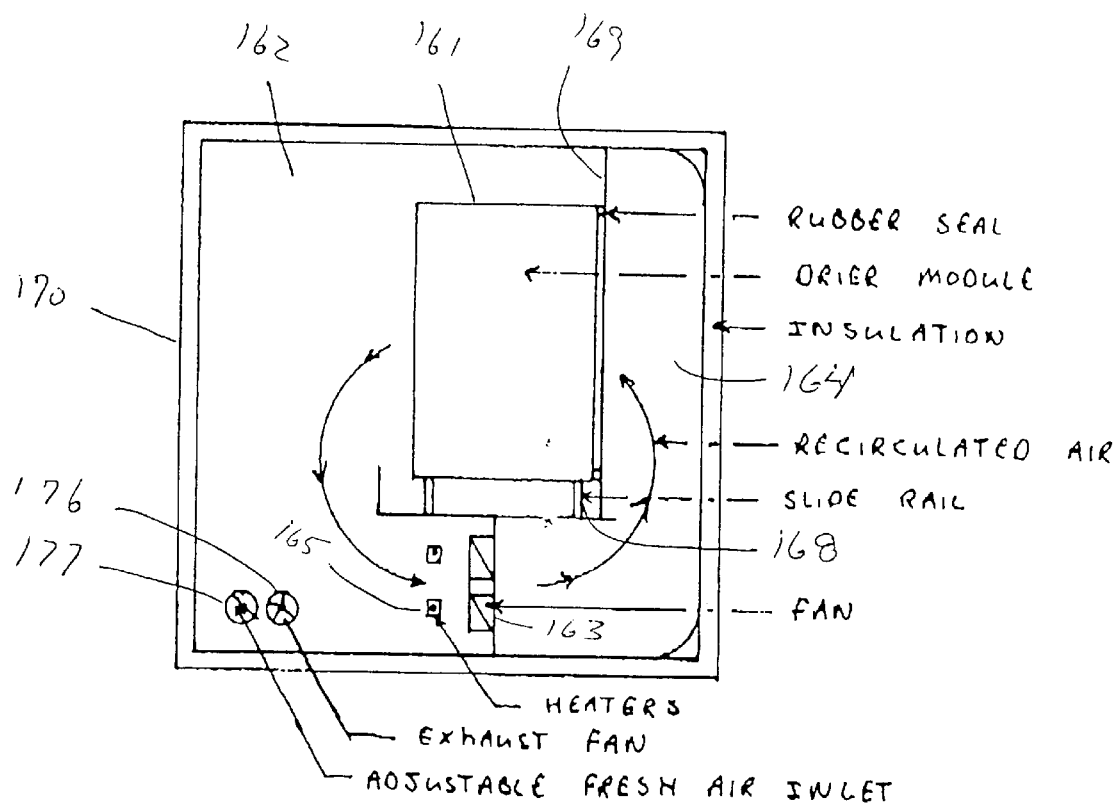
FIG. 17 is a diagrammatic cross section view of a dryer similar to that of FIG. 16, but having a fan forced secondary airflow of makeup and exhaust air vents in the low pressure chamber rather than an air dryer.

FIG. 17 is the same as FIG. 16 except that enclosure 170 incorporates an open secondary airflow circuit in lieu of dehumidifier 166, through exhaust fan 176 and adjustable inlet 177 servicing low pressure plenum 162. This permits the primary airflow through the container to be set at a higher rate for most effective drying action, and a lower secondary airflow rate, which is adequate to remove the accumulated moisture by continuously replacing a small portion of the relatively moisture ladened total primary airflow volume with dry air. The total energy cost for heating and moving air so as to dry the contents of the container is improved over the single open circuit system of the earlier described systems.

Figure 18:
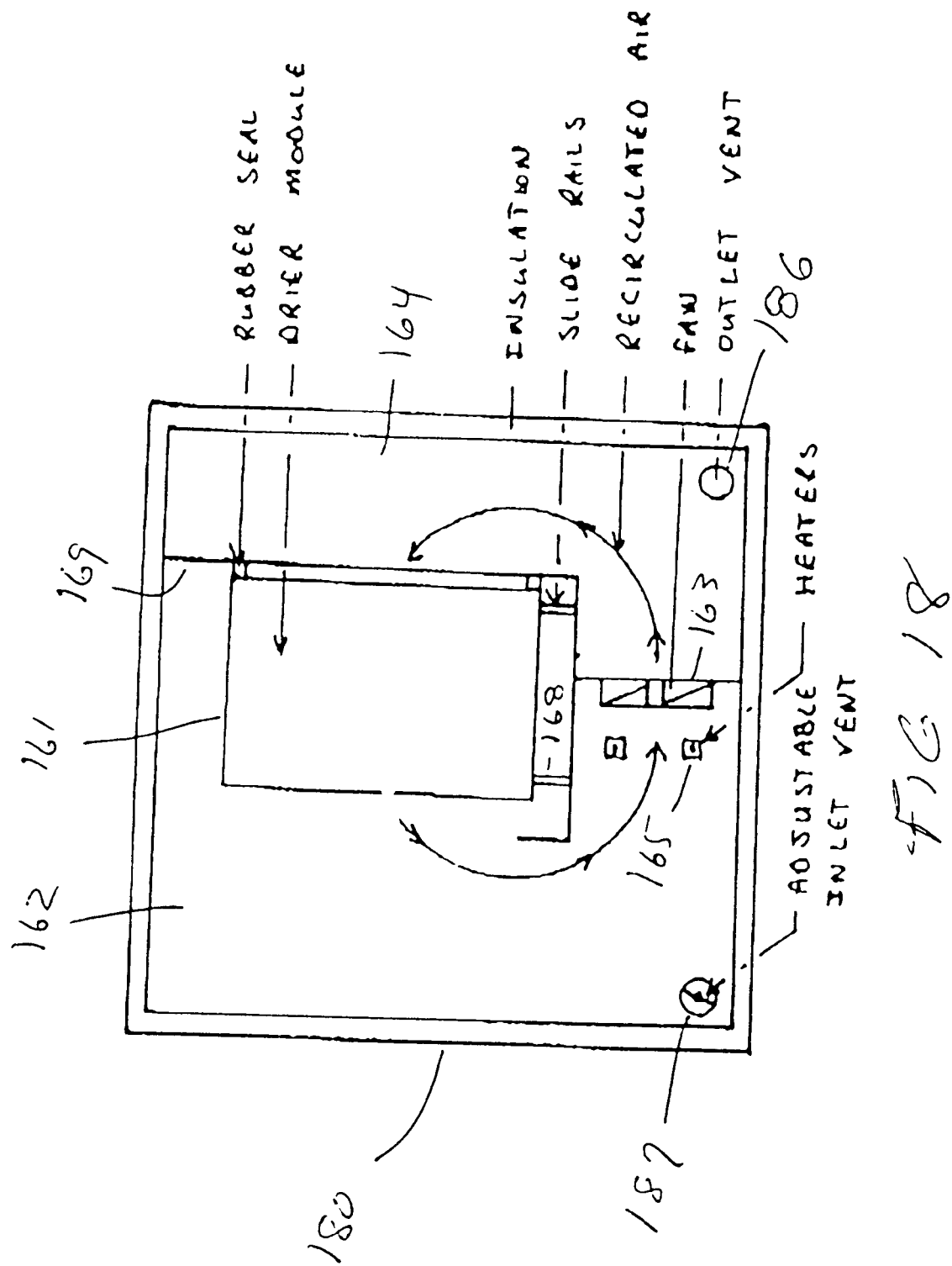
FIG. 18 is a diagrammatic cross section view of a dryer similar to that of FIG. 17, except that the exhaust air outlet is in the high pressure chamber so that secondary airflow is generated by the air pressure differential between chambers.

FIG. 18 is the same as FIG. 17 except that enclosure 180 incorporates outlet vent 186 in the high pressure plenum 164 and adjustable inlet vent 187 in the low pressure plenum 162 in lieu of the exhaust fan 176 and inlet 177 of FIG. 17, as defining the secondary airflow circuit. The pressure differential maintained between plenums 162 and 164 by fan 163 enables the secondary circuit, with balancing between primary and secondary airflow circuits provided by the adjustability of inlet vent 187.

Figure 19:
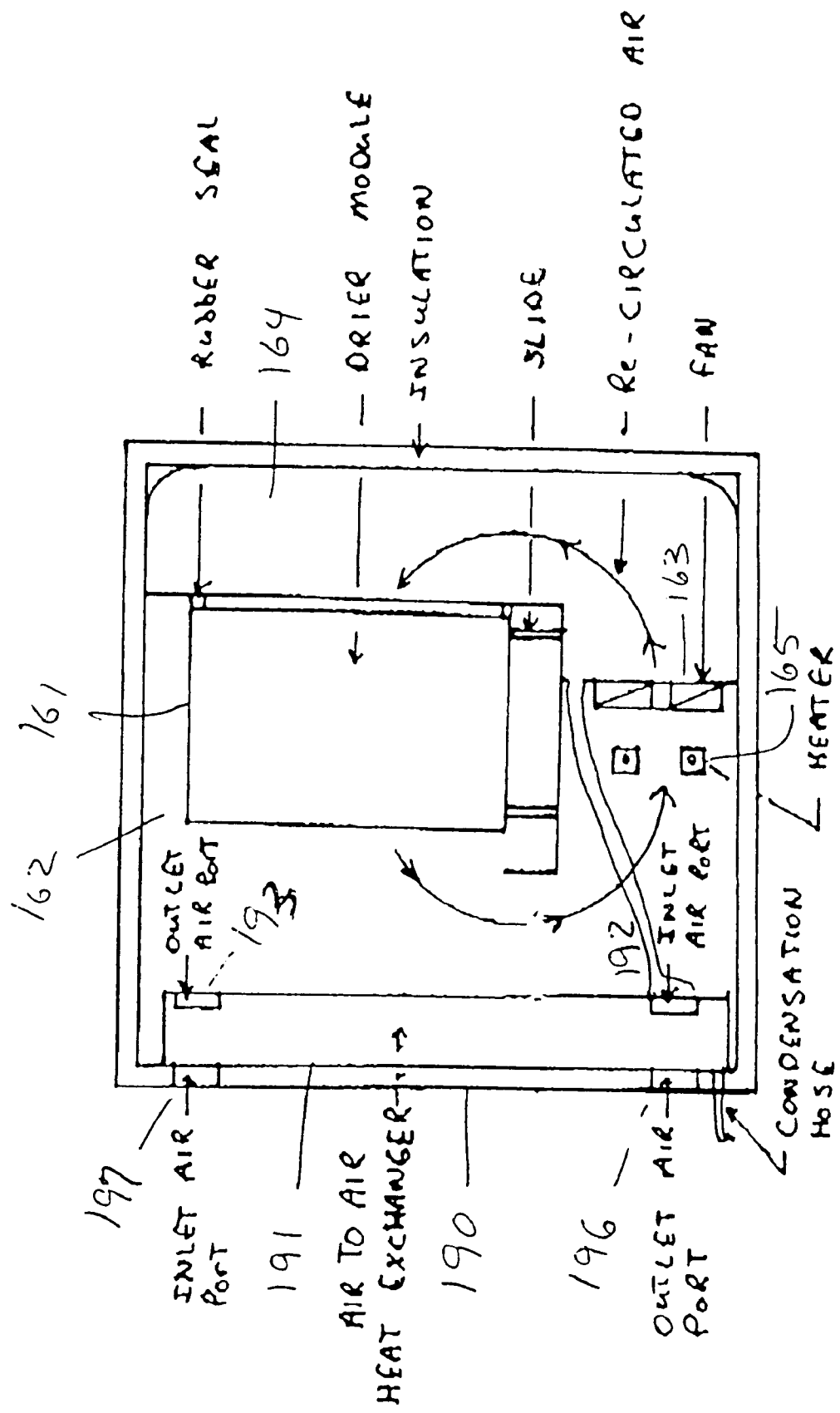
FIG. 19 is a diagrammatic cross section view of a dryer similar to that of FIG. 18, except that an air to air heat exchanger is added to scavenge exhaust air heat for heating makeup air.

FIG. 19 is the same as FIG. 18, except that the secondary airflow circuit incorporates air to air heat exchanger 191, where a partial outflow from high pressure plenum 164 enters heat exchanger 191 at inlet 192 and exits at adjustable outlet 196, and make up air enters heat exchanger at inlet 197 and exits heat exchanger at outlet 193 within low pressure plenum 162.

Figure 20:
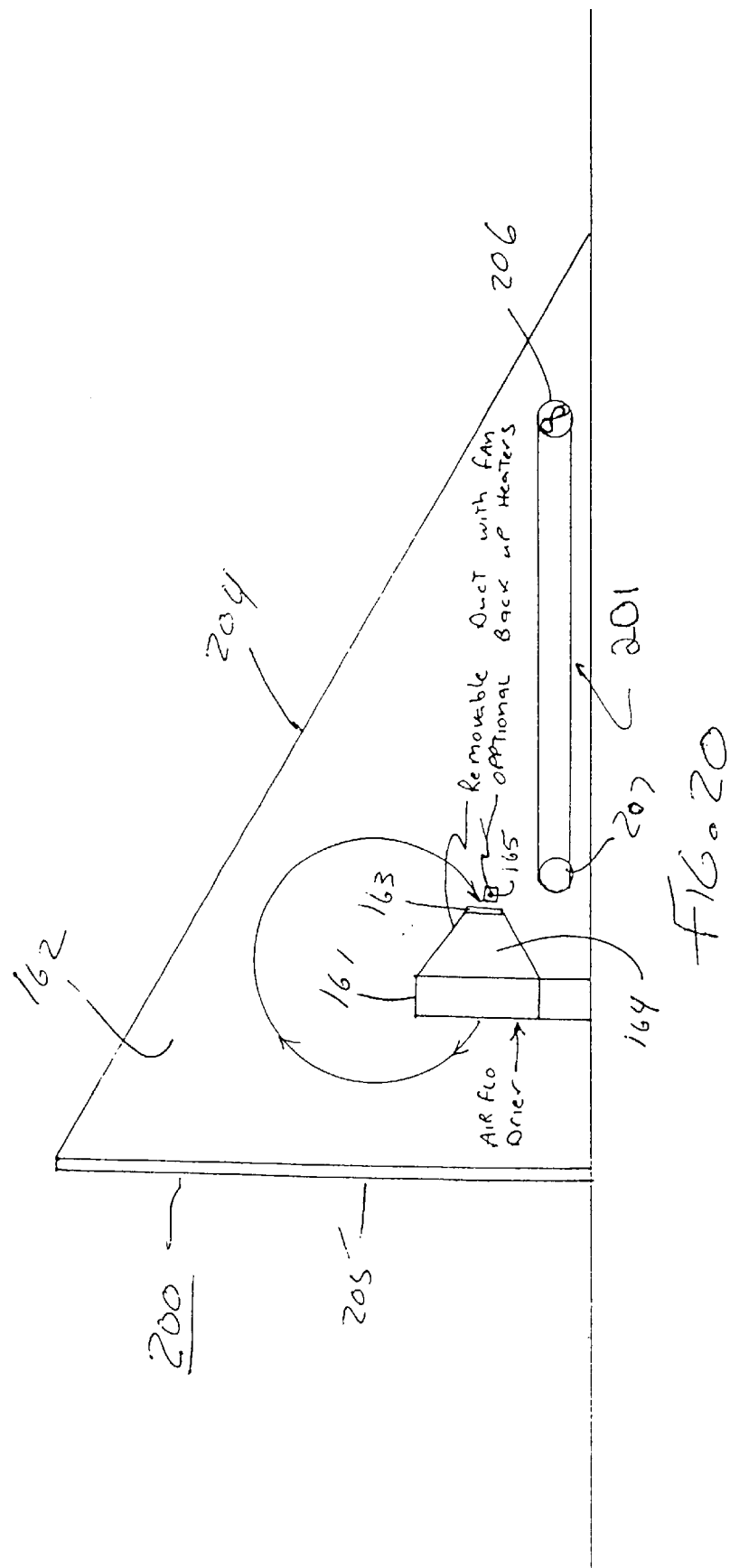
FIG. 20 is a diagrammatic cross section view of a dryer similar in function to that of FIG. 19, except that in incorporates solar heating of the primary airflow, and the air to air heat exchanger and secondary airflow path is fan forced.

FIG. 20 is visually different but functionally the same as FIG. 19, except for the following. Enclosure 200 consists of a solar panel section 204 and insulated walls 205 for providing solar heating of the primary airflow in low pressure plenum 162. As in the previous FIGS. 16–19, the closed loop primary airflow circuit is through container 161, low pressure plenum 162, fan 163, high pressure plenum 164 and again through container 161. Heater 165 adjacent fan 163 is option where solar heating is sufficient. The secondary airflow circuit in this embodiment is moved by its own airmover device rather than by the differential pressure between plenums. It consists of air to air heat exchanger 201, where a partial outflow from low pressure plenum 162 enters heat exchanger 191 at an inlet (not shown) and exits at exhaust fan outlet 206, and make up air enters heat exchanger 201 at inlet 207 and exits heat exchanger within low pressure plenum 162. The utilization of passive solar heat for heating the primary airflow further reduces the system operating cost at a minimal further capital cost. As in the prior embodiments, the drying efficiency of the system for drying the materials in the airflow plate container 161 may be optimized for drying time and energy consumption by suitably balancing the primary airflow rate and temperature, and the percentage of secondary airflow for exhausting moist air and supplying pre-heated make up ambient air. Heat exchanger 201 is configured within low pressure plenum 162 and behind solar panel section 204 so as to derive further benefit from direct passive solar heating that adds heat to the secondary airflow circuit makeup air.

Figure 21:
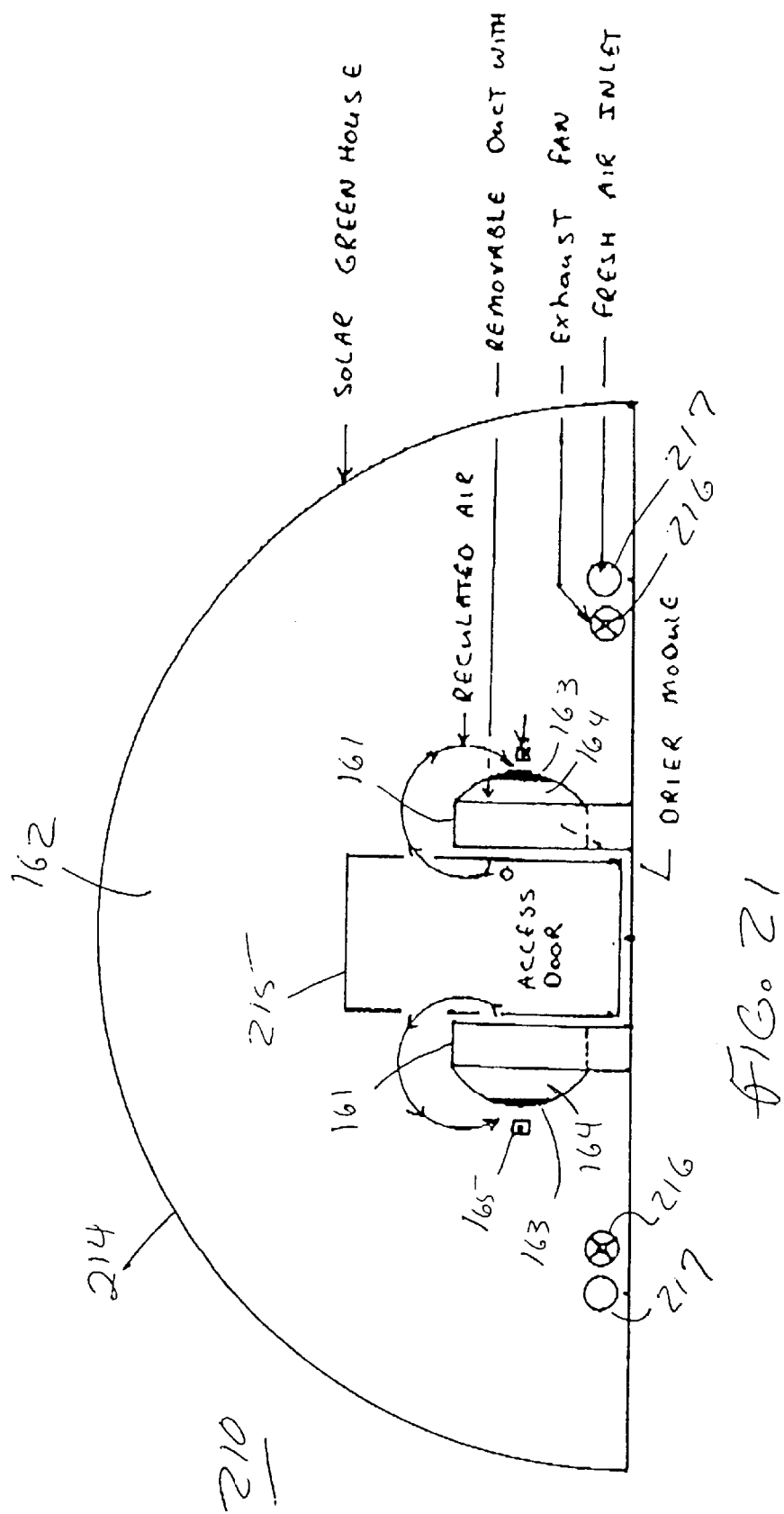
FIG. 21 is a diagrammatic cross section view of a multiple container embodiment of the invention, each container having its own high pressure chamber and sharing a common low pressure chamber.

FIG. 21 is visually distinguished but functionally the same as the embodiment of FIG. 20, except for the following. Enclosure 210 is a green house, having a solar permeable exterior 214, by which passive solar heating of the primary airflow is accomplished, and a convenient access door 215. The primary airflow circuit serves two airflow plate containers 161, which each have a fan 163 and high pressure plenum 164, but sharing a common low pressure plenum 162, which consumes most of the interior volume of the enclosure. Optional heaters 165 are optimally positioned adjacent fans 163 for further heating capacity. The heaters can be solar hot water heaters, or electric or wood or fossil fuel heaters intended to augment the solar heat during night or times of extended cloudiness. The secondary airflow circuit is produced by two exhaust fans 216 diagonally positioned on opposite corners of the enclosure, and interspersed with two adjustable inlets 217 on the other two opposite corners of the enclosure. The two containers 161 can each be a line of containers 161, each served with its own fan 163 and high pressure plenum 164, for the length of the enclosure. Secondary airflow capacity must be altered accordingly.

FIG. 22 is visually distinguished but functionally the same as the embodiment of FIG. 18, except for the following. Enclosure 220 is a green house, having a solar permeable exterior 224, by which passive solar heating of the primary airflow is accomplished. The interior is divided by two partitions 169 into three plenums, a center low pressure plenum 162 sandwiched between two high pressure plenums 164. Each of two airflow plate containers 161 are sealed to a respective partition 169. Fans 163 in each partition 169 pull the primary airflow through containers 161, hence through the common low pressure plenum 162, and divide and push it into high pressure plenums 164 and back into containers 161. Optional heaters 165 provide for additional airflow heating capacity. The secondary airflow circuit is provided by adjustable inlet vent 227 in low pressure plenum 162 and outlets 226 in each of high pressure plenums 164. Enclosure 220 has three convenient access doors 215, one serving each plenum. It will be appreciated that the fan direction, primary airflow, and secondary vent orientation can be reversed. It will be further appreciated that each partition 169 and container 161 can be a long partition and several containers for the length of enclosure 220. Vents and airmovers would have to be sized and positioned accordingly.

FIG. 23 is visually distinct but functionally the same as the embodiment of FIG. 20, except for the following. Enclosure 230 is a green house, having a solar permeable exterior 234, by which passive solar heating of the primary airflow is accomplished. The interior is principally dedicated to low pressure plenum 162. Each of two airflow plate containers 161 are coupled with high pressure plenums 164 configured with fans 163 for maintaining the primary airflow. Optional heaters 165 adjacent fans 163 provide for additional airflow heating capacity. The secondary airflow circuit in this embodiment is moved by its own airmover device rather than by the differential pressure between plenums as in some embodiments. It consists of two vertically oriented air to air heat exchanger 231, where a partial outflow from low pressure plenum 162 enters heat exchanger 231 at an inlet (not shown) and exits at exhaust fan outlet 236, and make up air enters heat exchanger 231 at inlet 237 and exits heat exchanger within low pressure plenum 162. Heat exchangers 231 are configured within solar permeable section 234 so as to derive further benefit from direct passive solar heating that adds heat to the secondary airflow circuit makeup air. It will be further appreciated that each container 161 and plenum 164 with its fan 163 can be a line of such assemblies as long as the length of enclosure 230. Secondary airflow circuit heat exchangers, vents and exhaust fans would have to be sized and positioned accordingly.

The design configuration of the closed primary airflow circuit dryer enclosure and the airflow plate containers can be scaled and varied as required for drying various batch quantities of crops or other materials, always incorporating appropriate vertical and/or horizontal airway partitioning elements uniformly distributed throughout the container. The drying effect radiates outward by convective and conductive means into the wet granular or sliced materials from each airway passage on each airflow plate in the container, and uniformly over time reduces the moisture content of the materials, carrying the moisture out with the primary airflow to where it is removed from the dryer system by air dryers or the secondary airflow air exchange.

The bottom of the airflow plate container can be configured with a releasable door or dump gate assembly that is ventilated as necessary to permit airflow to the airplates, while closing off the bottom opening of the bays or compartments which hold the sliced or bulk material being dried. The gates can be easily opened, manually or remotely if so configured, to dump or empty the container without the need to turn it over. The containers can be configured for easy manipulation for being withdrawn from the dryer enclosures for emptying and refilling, including the use of mechanisms for sliding, rolling, and/or rotating the containers, and combinations of such actions, and the use of drop gates, doors and plungers to clear the containers of contents.

The airflow plate container and in particular the embodiments of FIGS. 16–23 of the invention are quite suitable for drying apple slices, for example. Other foods and fruits or articles of other types having a significant moisture content and that are of the correct thickness or are susceptible of reduction into slices of uniform thickness that will still hold a suitable degree of rigidity for edge stacking between airflow plates, can be dried in the vertical slots of the containers. For slices that tend to stick to the airflow panels in the drying process, manual or automated removal forks and light combing or sweeping of the airflow plates can be employed to release the slices. The combing or scrubbing action can be accomplished by a simple grid that is laid over the top of the container so as to place a bar or gate over each open compartment, so that lifting of an airflow plate partially out of its slot causes a combing action by the bar that releases any sticking fruit slices to fall back into the container. Alternatively, an automated plunger system can be used to evacuate the container after the bottom gate is opened.

For slices of food, fruit, or other articles less tolerance of vertical stacking, such as sliced tomatoes or bananas, container and system embodiments using grooved or corrugated panels with slots oriented in the horizontal plane, resembling a stack of corrugated trays, are useful. The horizontal plane airflow plate embodiments are less critical as to the thickness of slices, as well, and some foods and fruits are better suited to being dried in relatively thin slices.

There are other and numerous embodiments of the invention. For example, there is a dryer system for drying materials of uniform thickness, meaning to include granular materials of relatively uniform diameter such as coffee beans, berries, nuts and the like, as well as slices of uniform thickness of fruit and other wet materials from which moisture is desired to be removed. The dryer system may consist of a container for holding the materials for drying, a high pressure plenum communicating with a first ventilated surface of the container, a low pressure plenum communicating with an opposing ventilated surface of the container; and a plurality of parallel and uniformly spaced airflow plates disposed within the container so as to form bays of uniform widths sufficient to accommodate the sliced materials of uniform thickness. The airflow plates are configured with open wall airflow channels connecting the inlet plenum to the outlet plenum.

There is a primary airflow circuit consisting of a connecting airway running from the low pressure plenum to the high pressure plenum and hence through the container and into the low pressure plenum, and a primary airflow sustainable by an air mover such as a fan. There may be means for heating the primary airflow including airflow heaters of any or all types, and there may be incorporated control mechanisms and airflow coolers for controlling the average temperature of the airflow. There are also means for removing moisture from the primary airflow, such as air dryers of any or all types or secondary airflows partially exhausting wet air and providing relatively drier makeup air. There are means for sustaining the secondary airflow, such as solar heated plenums, flues or the use of electric fans. There may be an inlet for the make up air configured in a low pressure plenum and an outlet for exhaust air configured in the high pressure plenum, with at least one being adjustable for controlling the rate of said secondary airflow relative to the pressure differential between the inlet and the outlet. In the case of coffee beans in particular, the bays defined by the airflow plates may be vertically oriented and extend to much more than four feet, even up to 16 feet and higher.

As another example, there is a dryer system expressly for drying sliced materials of uniform thickness, consisting of a container for holding the sliced materials for drying, an inlet plenum communicating with a first ventilated surface of the container, an outlet plenum communicating with an opposing ventilated surface of the container; a plurality of parallel and uniformly spaced airflow plates disposed within the container so as to define a parallel set of bays of uniform thickness sufficient to accommodate a layer of the sliced materials, where the airflow plates are configured with open wall airflow channels connecting the inlet plenum to the outlet plenum. There is means for exerting a pressure differential between the inlet plenum and the outlet plenum so as to maintain an airflow through the container. There may be means for controlling the airflow temperature, including means for heating and/or cooling airflow to higher than ambient temperature or such other temperature as may be useful for the materials being dried. The airflow plates may be oriented as horizontal bays within the container and the airflow channels be horizontal, or the airflow plates may be oriented as vertical bays within the container with the airflow channels being horizontal or vertically oriented. The container may be configured for top feeding and underside removal of the sliced materials, which may be sliced fruit.

The descriptions and figures of the preferred embodiments are illustrative of the invention, but other embodiments within the scope of the invention and the claims below, as will be readily apparent to those skilled in the art.

I claim:

1. A dryer system for drying materials of uniform thickness comprising:
   a container for holding said materials for drying,
   a high pressure plenum communicating with a first ventilated surface of said container,
   a low pressure plenum communicating with an opposing ventilated surface of said container;
   a plurality of parallel and uniformly spaced airflow plates disposed within said container, said airflow plates configured with open wall airflow channels connecting said inlet plenum to said outlet plenum,
   a primary airflow circuit comprising a connecting airway running from said low pressure plenum to said high pressure plenum and hence through said container and into said low pressure plenum,
   a primary airflow sustainable by an air mover, and
   means for removing moisture from said primary airflow.

2. A dryer system for drying materials of uniform thickness according to claim 1, further comprising means for heating said primary airflow.

3. A dryer system for drying materials of uniform thickness according to claim 2, further comprising means for controlling said means for heating.

4. A dryer system for drying materials of uniform thickness according to claim 2, said means for heating said primary airflow comprising a solar permeable enclosure.

5. A dryer system for drying materials of uniform thickness according to claim 2, said means for heating said primary airflow comprising a heater in said airway.

6. A dryer system for drying materials of uniform thickness according to claim 5, said heater configured proximate said fan.

7. A dryer system for drying materials of uniform thickness according to claim 1, said means for removing moisture from said primary airflow comprising an air dryer to which said primary airflow is exposed.

8. A dryer system for drying materials of uniform thickness according to claim 1, said means for removing moisture from said primary airflow comprising a secondary airflow of make up air and exhaust air to which said primary airflow is exposed, and a means for sustaining said secondary airflow.

9. A dryer system for drying materials of uniform thickness according to claim 8, said means for sustaining said secondary airflow comprising an inlet for said make up air configured in said low pressure plenum and an outlet for said exhaust air configured in said high pressure plenum.

10. A dryer system for drying materials of uniform thickness according to claim 9, at least one of said inlet and said outlet being adjustable for controlling the rate of said secondary airflow relative to the pressure differential between said inlet and said outlet.

11. A dryer system for drying materials of uniform thickness according to claim 8, said means for sustaining said secondary airflow comprising an inlet for said makeup air and an outlet for said exhaust, at least one of which is configured with a fan.

12. A dryer system for drying materials of uniform thickness according to claim 8, said secondary airflow further comprising a heat exchanger for transferring heat from said exhaust air to said make up air heat.

13. A dryer system for drying materials of uniform thickness according to claim 1, said dryer system comprising a greenhouse, said means for removing moisture from said primary airflow comprising a secondary airflow of make up air and exhaust air to which said primary airflow is exposed, and a means for sustaining said secondary airflow.

14. A dryer system for drying materials of uniform thickness according to claim 1, said airflow plates oriented as horizontal bays within said container.

15. A dryer system for drying materials of uniform thickness according to claim 1, said airflow plates oriented as vertical bays within said container.

16. A dryer system for drying materials of uniform thickness according to claim 15, said container configured for top feeding and underside removal of said materials of uniform thickness.

17. A dryer system for drying materials of uniform thickness, comprising:
   a materials container for holding said materials for drying,
   a high pressure plenum communicating with a first ventilated surface of said container,
   a low pressure plenum communicating with an opposing ventilated surface of said container;
   a plurality of parallel and uniformly spaced corrugated airflow plates disposed within said container so as to define bays of at least said uniform thickness, said airflow plates configured with open wall airflow channels connecting said inlet plenum to said outlet plenum,
   a primary airflow circuit comprising a connecting airway running from said low pressure plenum to said high pressure plenum and hence through said container and into said low pressure plenum,
   a primary airflow sustainable by a fan,
   a solar permeable enclosure for heating said primary airflow,
   means for removing moisture from said primary airflow.

18. A dryer system for drying materials of uniform thickness according to claim 17, further comprising a heater in said airway for heating said primary airflow.

19. A dryer system for drying materials of uniform thickness according to claim 17, said means for removing moisture from said primary airflow comprising an air dryer to which said primary airflow is exposed.

20. A dryer system for drying materials of uniform thickness according to claim 17, said means for removing moisture from said primary airflow comprising a secondary airflow of make up air and exhaust air to which said primary airflow is exposed, and further comprising a heat exchanger for transferring heat from said exhaust air to said make up air heat.

21. A dryer system for drying materials of uniform thickness according to claim 17, said materials of uniform thickness being sliced fruit.

22. A dryer system for drying materials of uniform thickness according to claim 17, said materials of uniform thickness being coffee beans, said bays being vertically oriented and extending to more than four feet, said airflow channels being horizontally oriented.

23. A dryer system for drying sliced materials of uniform thickness comprising:
   a container for holding said sliced materials for drying,
   an inlet plenum communicating with a first ventilated surface of said container,
   an outlet plenum communicating with an opposing ventilated surface of said container, a plurality of parallel and uniformly spaced airflow plates disposed within said container so as to define a parallel set of bays of uniform thickness, said airflow plates configured with open wall airflow channels connecting said inlet plenum to said outlet plenum, means for exerting a pressure differential between said inlet plenum and said outlet plenum so as to maintain an airflow through said container.

24. A dryer system for drying sliced materials of uniform thickness according to claim 23, further comprising means for heating said airflow to higher than ambient temperature.

25. A dryer system for drying sliced materials of uniform thickness according to claim 24, further comprising means for controlling said means for heating.

26. A dryer system for drying sliced materials of uniform thickness according to claim 23, said means for exerting a pressure differential comprising a fan proximate one of said inlet plenum and said outlet plenum.

27. A dryer system for drying sliced materials of uniform thickness according to claim 24, said means for heating said airflow comprising a solar permeable enclosure.

28. A dryer system for drying sliced materials of uniform thickness according to claim 27, said means for heating said airflow comprising a heater proximate said inlet plenum.

29. A dryer system for drying sliced materials of uniform thickness according to claim 23, said airflow plates oriented as horizontal bays within said container.

30. A dryer system for drying sliced materials of uniform thickness according to claim 23, said airflow plates oriented as vertical bays within said container, said airflow channels being vertically oriented.

31. A dryer system for drying sliced materials of uniform thickness according to claim 30, said container configured for top feeding and underside removal of said materials of uniform thickness.

32. A dryer system for drying sliced materials of uniform thickness according to claim 23, said materials of uniform thickness comprising sliced fruit.

* * * * *